(12) United States Patent
Yahara

(10) Patent No.: US 7,197,704 B1
(45) Date of Patent: Mar. 27, 2007

(54) DOCUMENT MANAGEMENT METHOD, SYSTEM, AND STORAGE MEDIUM THEREOF WITH PRIORITY ASSIGNMENT INDICATIVE OF PROCESSING ORDER

(75) Inventor: Masashi Yahara, Ohta-ku (JP)

(73) Assignee: Canon Kabushiki Kaisha (JP)

(*) Notice: Subject to any disclaimer, the term of this patent is extended or adjusted under 35 U.S.C. 154(b) by 706 days.

(21) Appl. No.: 09/615,243

(22) Filed: Jul. 13, 2000

(30) Foreign Application Priority Data

Jul. 14, 1999 (JP) .................................. 11-200332

(51) Int. Cl.
*G06F 17/00* (2006.01)

(52) U.S. Cl. ...................................... 715/530; 707/200

(58) Field of Classification Search ................ 715/513, 715/530, 900–911; 707/200, 201, 202, 203, 707/204, 205, 206, 1–10; 709/206
See application file for complete search history.

(56) References Cited

U.S. PATENT DOCUMENTS

| | | | | |
|---|---|---|---|---|
| 4,873,513 A * | 10/1989 | Soults et al. ................... 345/27 |
| 5,247,665 A * | 9/1993 | Matsuda et al. ............. 707/101 |
| 5,563,997 A * | 10/1996 | Fisher ......................... 345/809 |
| 5,813,009 A * | 9/1998 | Johnson et al. ............. 707/100 |
| 5,920,846 A * | 7/1999 | Storch et al. ................... 705/7 |
| 5,940,813 A * | 8/1999 | Hutchings ..................... 705/43 |
| 5,991,758 A * | 11/1999 | Ellard ............................ 707/6 |
| 6,266,641 B1 * | 7/2001 | Takaya ........................ 704/276 |
| 6,278,992 B1 * | 8/2001 | Curtis et al. ................... 707/3 |
| 6,279,031 B1 * | 8/2001 | Kawasaki et al. .......... 709/207 |
| 6,360,215 B1 * | 3/2002 | Judd et al. ...................... 707/3 |
| 6,424,995 B1 * | 7/2002 | Shuman ....................... 709/206 |
| 6,466,902 B1 * | 10/2002 | Lu ................................. 704/9 |
| 6,571,215 B1 * | 5/2003 | Mahapatro ..................... 705/8 |
| 6,678,880 B1 * | 1/2004 | Roddy ......................... 717/108 |

OTHER PUBLICATIONS http://www.comp.nus.edu.sg/~xuedamin/programs/204/doc.txt published Jul. 23, 2001.*

* cited by examiner

*Primary Examiner*—Stephen Hong
*Assistant Examiner*—Adam Queler
(74) *Attorney, Agent, or Firm*—Rossi, Kimms & McDowell LLP

(57) ABSTRACT

There are provided a provide a document management method, a document management system, and a storage medium storing a program for executing the method, which enable a plurality of documents provided with identifiers having respective priorities to be collectively subjected to processing operations according to the order of priority. A plurality of files of documents are managed by recording the plurality of files of documents such that the files can be retrieved. Attribute information of recorded ones of the plurality of files, information of results of retrieval carried out on the files, and information of indices for the files, are listed on a file-by-file basis, in a single document file list. Identifiers having respective priorities independent of the results of the retrieval are assigned to a plurality of files listed in the single document file list, that are desired to be subjected to a predetermined identical processing. The listed files to which the identifies having the respective priorities are assigned, are subjected to the predetermined identical processing according to the respective priorities of the identifiers.

30 Claims, 35 Drawing Sheets

| Properties | No | Title | Chapter | Pages | Rank | EntryDate |
|---|---|---|---|---|---|---|
| ○ ② | 1 | function spec | 3 | 23 | A | 98/06/26 |
| ○ | 2 | function spec | 1(all) | 32 | A | 98/07/21 |
| ○ ① | 3 | menu spec | 3-1 | 36 | A | 98/07/21 |
| ○ | 4 | X-3 report | 1 | 10 | C | 98/07/21 |
| ○ ⑤ | 5 | X-3 report | 2 | 10 | C | 98/07/21 |
| ○ | 6 | menu spec | 3-2 | 5 | B | 98/07/21 |
| ○ | 7 | X-11 report | 1 | 12 | | 98/07/21 |
| ○ ③ | 8 | figure 3 | 2 | 8 | | 98/07/21 |
| ○ ④ | 9 | X-3 report | 1 | 22 | | 98/07/21 |
| | | | | | | |

FIG.18

| Properties | No | Title | Chapter | Pages | Rank | EntryDate |
|---|---|---|---|---|---|---|
| ○ ★ | 1 | menu spec | 1-1 | 23 | A | 98/06/26 |
| ○ ■ | 2 | function spec | 1(all) | 32 | A | 98/07/21 |
| ○ | 3 | menu spec | 3-1 | 36 | A | 98/07/21 |
| ○ | 4 | X-3 report | 1 | 10 | C | 98/07/21 |
| ○ ★ | 5 | X-3 report | 2 | 10 | C | 98/07/21 |
| ○ ■ | 6 | menu spec | 3-2 | 5 | B | 98/07/21 |
| ○ | 7 | X-11 report | 1 | 12 | | 98/07/21 |
| ○ | 8 | X-11 report | 2 | 8 | | 98/07/21 |
| ○ | 9 | X-12 report | 1 | 22 | | |

FIG.19

| Properties | No | Title | Chapter | Pages | Rank | EntryDate |
|---|---|---|---|---|---|---|
| ○ ② | 1 | function spec | 3 | 23 | A | 98/06/26 |
| ○ | 2 | function spec | 1(all) | 32 | A | 98/07/21 |
| ○ ① | 3 | menu spec | 3-1 | 36 | A | 98/07/21 |
| ○ | 4 | X-3 report | 1 | 10 | C | 98/07/21 |
| ○ ⑤ | 5 | X-3 report | 2 | 10 | C | 98/07/21 |
| ○ | 6 | menu spec | 3-2 | 5 | B | 98/07/21 |
| ○ | 7 | X-11 report | 1 | 12 | | 98/07/21 |
| ○ ③ | 8 | figure 3 | 2 | 8 | | 98/07/21 |
| ○ ④ | 9 | X-3 report | 1 | 22 | | 98/07/21 |

FIG.20

| Properties | No | Title | Chapter | Pages | Rank | EntryDate |
|---|---|---|---|---|---|---|
| ○ | 1 | function spec | 1(all) | 32 | A | 98/07/21 |
| ○ | 2 | menu spec | 3-1 | 99 | A | 98/12/24 |
| ○ | 3 | X-3 report | 1 | 10 | C | 98/07/21 |
| ○ | 4 | menu spec | 3-2 | 5 | B | 98/07/21 |
| ○ | 5 | X-11 report | 1 | 12 | | 98/07/21 |
| | | | | | | |

| Properties | No | Title |
|---|---|---|
| ○ ② | 1 | menu spec |
| ○ | 2 | function spec |
| ○ ① | 3 | menu spec |
| ○ | 4 | X-3 report |
| ○ ⑤ | 5 | X-3 report |
| ○ | 6 | menu spec |
| ○ | 7 | X-11 report |
| ○ ③ | 8 | X-11 report |
| ○ ④ | 9 | X-12 report |

| Properties | No | Title | Chapter | Pages | Rank | EntryDate |
|---|---|---|---|---|---|---|
| ◯ | 1 | function spec | 1(all) | 32 | A | 98/07/21 |
| ◯ | 2 | menu spec | 3-1 | 99 | A | 98/12/24 |
| ◯ | 3 | X-3 report | 1 | 10 | C | 98/07/21 |
| ◯ | 4 | menu spec | 3-2 | 5 | B | 98/07/21 |
| ◯ | 5 | X-11 report | 1 | 12 | | 98/07/21 |
| | | | | | | |

| Properties | No | Title | Chapter | Pages | Rank | EntryDate |
|---|---|---|---|---|---|---|
| ○ ② | 1 | function spec | 3 | 23 | A | 98/06/26 |
| ○ | 2 | function spec | 1(all) | 32 | A | 98/07/21 |
| ○ ① | 3 | menu spec | 3-1 | 36 | A | 98/07/21 |
| ○ | 4 | X-3 report | 1 | 10 | C | 98/07/21 |
| ○ ⑤ | 5 | X-3 report | 2 | 10 | C | 98/07/21 |
| ○ | 6 | menu spec | 3-2 | 5 | B | 98/07/21 |
| ○ | 7 | X-11 report | 1 | 12 | | 98/07/21 |
| ○ ③ | 8 | figure 3 | 2 | 8 | | 98/07/21 |
| ○ ④ | 9 | X-3 report | 1 | 22 | | 98/07/21 |

FIG.26

| Properties | No | Title | Chapter | Pages | Rank | EntryDate |
|---|---|---|---|---|---|---|
| ○ ② | 1 | function spec | 3 | 23 | A | 98/06/26 |
| ○ | 2 | function spec | 1(all) | 32 | A | 98/07/21 |
| ○ ① | 3 | menu spec | 3-1 | 36 | A | 98/07/21 |
| ○ ③ | 4 | X-3 report | 1 | 10 | C | 98/07/21 |
| ○ ⑥ | 5 | X-3 report | 2 | 10 | C | 98/07/21 |
| ○ | 6 | menu spec | 3-2 | 5 | B | 98/07/21 |
| ○ | 7 | X-11 report | 1 | 12 | | 98/07/21 |
| ○ ④ | 8 | figure 3 | 2 | 8 | | 98/07/21 |
| ○ ⑤ | 9 | X-3 report | 1 | 22 | | 98/07/21 |

FIG.29

| Properties | No | Title | Chapter | Pages | Rank | EntryDate |
|---|---|---|---|---|---|---|
| ① | 1 | menu spec | 3-1 | 36 | A | 98/07/21 |
| ② | 2 | menu spec | 1-1 | 23 | A | 98/06/26 |
| ③ | 3 | X-11 report | 2 | 8 | | 98/07/21 |
| ④ | 4 | X-12 report | 1 | 22 | | 98/07/21 |
| ⑤ | 5 | X-13 report | 2 | 10 | C | 98/07/21 |
| | | | | | | |

| Properties | No | Title | Chapter | Pages | Rank | EntryDate |
|---|---|---|---|---|---|---|
| ○ ② | 1 | function spec | | 23 | A | 98/06/26 |
| ○ ④ | 2 | function spec | | 32 | A | 98/07/21 |
| ○ ① | 3 | function spec | | 36 | B | 98/07/21 |
| ○ | 4 | X-3 report | | 10 | B | 98/07/21 |
| ○ ⑤ | 5 | function spec | | 10 | B | 98/07/21 |
| ○ | 6 | menu | | 5 | C | 98/07/21 |
| ○ ③ | 7 | function spec | | 12 | C | 98/07/21 |
| ○ | 8 | X-11 report | | 8 | D | 98/07/21 |
| ○ | 9 | function spec | | 22 | E | 98/07/21 |

FIG.32

| Properties | No | Title | Chapter | Pages | Rank | EntryDate |
|---|---|---|---|---|---|---|
| ① | 3 | function spec | ☐ | 36 | B | 98/07/21 |
| ② | 1 | function spec | ☐ | 23 | A | 98/06/26 |
| ③ | 7 | function spec | ☐ | 12 | C | 98/07/21 |
| ④ | 2 | function spec | ☐ | 32 | A | 98/07/21 |
| ⑤ | 5 | function spec |  | 10 | B | 98/07/21 |
| ○ | 4 | X-3 report |  | 10 | B | 98/07/21 |
| ○ | 6 | menu |  | 5 | C | 98/07/21 |
| ○ | 8 | X-11 report |  | 8 | D | 98/07/21 |
| ○ | 9 | function spec |  | 22 | E | 98/07/21 |
|  |  |  |  |  |  |  |

FIG.34

| Properties | No | Title | Chapter | Pages | Rank | EntryDate |
|---|---|---|---|---|---|---|
| ○ ① | 3 | function spec | XYZ-1 | 36 | B | 98/07/21 |
| ○ ② | 1 | function spec | XYZ-2 | 23 | A | 98/06/26 |
| ○ ③ | 7 | function spec | XYZ-3 | 12 | C | 98/07/21 |
| ○ ④ | 2 | function spec | XYZ-4 | 32 | A | 98/07/21 |
| ○ ⑤ | 5 | function spec | XYZ-5 | 10 | B | 98/07/21 |
| ○ | 4 | X-3 report | | 10 | B | 98/07/21 |
| ○ | 6 | menu | | 5 | C | 98/07/21 |
| ○ | 8 | X-11 report | | 8 | D | 98/07/21 |
| ○ | 9 | function spec | | 22 | E | 98/07/21 |
| | | | | | | |

| Properties | No | Title | Chapter | Pages | Rank | EntryDate |
|---|---|---|---|---|---|---|
| ○ ② | 1 | function spec | XYZ-2 | 23 | A | 98/06/26 |
| ○ ④ | 2 | function spec | XYZ-4 | 32 | A | 98/07/21 |
| ○ ① | 3 | function spec | XYZ-1 | 36 | B | 98/07/21 |
| | 4 | X-3 report | | 10 | B | 98/07/21 |
| ○ ⑤ | 5 | function spec | XYZ-5 | 10 | B | 98/07/21 |
| ○ | 6 | menu | | 5 | C | 98/07/21 |
| ○ ③ | 7 | function spec | XYZ-3 | 12 | C | 98/07/21 |
| ○ | 8 | X-11 report | | 8 | D | 98/07/21 |
| ○ | 9 | function spec | | 22 | E | 98/07/21 |
| | | | | | | |

W

72

DOCUMENT MANAGEMENT METHOD, SYSTEM, AND STORAGE MEDIUM THEREOF WITH PRIORITY ASSIGNMENT INDICATIVE OF PROCESSING ORDER

BACKGROUND OF THE INVENTION

1. Field of the Invention

This invention relates to a document management method, a document management system and a storage medium, for use in managing document files.

2. Prior Art

Conventionally, a document management system is known which edits image information obtained by reading an original such as a document, a drawing or the like, stores the edited image information in a recording medium, such as a magnetic disk and a magnetic optical disk, for management.

Generally, in a document management system of this kind, image information obtained by reading an original is compressed and recorded in a recording medium, such as a hard disk and an optical disk. Further, index information for use in retrieving the image information recorded in the recording medium is also recorded in the recording medium in a manner associated with the image information. Required image information is retrieved according to the index information, and the retrieved image information is read out and displayed on a display or printed on recording paper by a printer. Further, image processing operations e.g. for adding, editing, and modifying image information are executed as required.

FIG. 1 is a block diagram showing the arrangement of software-based data processing components of the conventional document management system (filing system), for reading an original such as a document, a drawing or the like by using a scanner to store the read image information in a document database.

In the figure, reference numeral 100 designates a scanner for converting image information obtained by electrically reading an original such as a document, a drawing or the like to a digital signal by a photoelectric conversion device or the like. Reference numeral 101 designates scanner control means for controlling the operation of the scanner 100. Reference numeral 102 designates database management means for managing the image information obtained by the scanner 100 and index information concerning the image information. Reference numeral 103 designates index input means for inputting index information concerning the image information obtained by the scanner 100. Reference numeral 104 designates a document database storing the image information and the index information.

In FIG. 1, arrows between the components indicate directions of flow of information.

Referring to FIG. 1, first, image information obtained by reading an original such as a document, a drawing or the like by using the scanner 100 is sent to the database management means 102 via the scanner control means 101. Further, index information concerning the image information input by the index input means 103 is also sent to the database management means 102. The database management means 102 adds the index information input by the index input means 103 to the image information sent from the scanner control means 101 and stores the resulting information in the document database 104.

FIG. 2 is a block diagram showing the arrangement of software-based data processing components of the conventional document management system (filing system), for retrieving desired image information from the document database by using retrieval means.

In the figure, reference numeral 200 designates a document database storing image information and index information concerning the image information. Reference numeral 201 designates a document database management means for managing the document database 200. Reference numeral 202 designates retrieval means for retrieving desired image information from the document database 200. The retrieval means 202 is capable of retrieving image information based on a retrieval condition input via retrieval condition input means 203. Reference numeral 204 designates retrieval result list management means for managing information indicative of results of retrieval by the retrieval means 202. Reference numeral 205 designates a retrieval result list in which results of retrieval by the retrieval means 202 are stored in the form of a list. Reference numeral 206 designates image display block control means for controlling an image display block 207 for displaying image information. Reference numeral 208 designates printer control means for controlling a printer 209 for printing image information.

In FIG. 2, arrows between the components indicate directions of flow of information.

Referring to FIG. 2, first, a retrieval condition of image information desired to be retrieved is input via the retrieval condition input means 203. Next, image information satisfying the retrieval condition of the image information desired to be retrieved, which is input via the retrieval condition input means 203, is retrieved from the document database 200 via the document database management means 201 by using the retrieval means 202, and information indicative of a result of the retrieval is output to the retrieval result list 205 via the retrieval result list management means 204. The retrieval result list management means 204 is capable of instructing various kinds of operations, including integration or copying of image information retrieved based on the above information indicative of results of the retrieval and output to the retrieval result list 205, according to settings of discrimination marks, and sending of the retrieved image information via the printer control means 208 to the printer 209 for printing.

However, the above conventional document management system is constructed such that a recording operation for recording image information and a retrieval operation for retrieving the image information are carried out separately from each other. Further, in the recording operation itself, a scanning operation for scanning image information and an input operation for inputting index information are each performed in a fixed manner. Further, in the recording operation, the recording of image information and the input of index information are carried out on a document-by-document basis.

Therefore, the operator is required to alternately carry out the scanning operation for scanning image information and the input operation for inputting index information, which makes it complicated to perform these operations, resulting in degraded productivity. Further, the conventional document management system is configured such that a recording operation and information indicative of a result of retrieval are not correlated with each other, so that if erroneous data is input by an erroneous operation, it is required that the recording operation is once terminated and then retrieval is carried out for correction of the erroneous data, which necessitates many operation steps and much time.

For the conventional document management system of the above-mentioned kind, there has been proposed a method of adding discrimination marks, respectively, to a plurality of documents in advance, and then collectively carrying out a processing operation on the plurality of documents with the discrimination marks added. In this method, however, since a plurality of documents are only provided with discrimination marks which are identical with each other, the processing order of the documents is indefinite. Consequently, when a plurality of documents having discrimination marks added thereto are subjected to integration, copying, or movement, the processing order of which is an important factor of the processing, there sometimes occur unexpected results, resulting in an increased possibility of wrong operations.

SUMMARY OF THE INVENTION

It is an object of the present invention to provide a document management method, a document management system, and a storage medium storing a program for executing the method, which enable a plurality of documents provided with identifiers having respective priorities to be collectively subjected to processing operations according to the order of priority.

To attain the object, according to a first aspect of the invention, there is provided a document management method of managing a plurality of files of documents by recording the plurality of files of documents such that the files can be retrieved, comprising the steps of:

listing attribute information of recorded ones of the plurality of files, information of results of retrieval carried out on the files, and information of indices for the files, on a file-by-file basis, in a single document file list;

assigning identifiers having respective priorities independent of the results of the retrieval to a plurality of files listed in the single document file list, that are desired to be subjected to a predetermined identical processing; and subjecting the listed files to which the identifies having the respective priorities are assigned, to the predetermined identical processing according to the respective priorities of the identifiers.

Preferably, the document management method further includes the step of displaying the respective priorities of the identifiers.

For instance, the predetermined identical processing is integration of the listed files according to the respective priorities of the identifiers.

For instance, the predetermined identical processing is copying of the listed files according to the respective priorities of the identifiers.

For instance, the predetermined identical processing is movement of the listed files according to the respective priorities of the identifiers.

Preferably, the document management method further includes the step of displaying the listed files according to the respective priorities of the identifiers.

Preferably, the identifiers are marks.

To attain the above object, according to a second aspect of the invention, there is provided a document management system capable of managing a plurality of files of documents by recording the plurality of files of documents such that the files can be retrieved, comprising:

document file listing means for listing attribute information of recorded ones of the plurality of files, information of results of retrieval carried out on the files, and information of indices for the files, on a file-by-file basis, in a single document file list;

identifier assigning means for assigning identifiers having respective priorities independent of the results of the retrieval to a plurality of files listed in the single document file list, that are desired to be subjected to a predetermined identical processing; and processing execution means for subjecting the listed files to which the identifies having the respective priorities are assigned, to the predetermined identical processing according to the respective priorities of the identifiers.

Preferably, the document management system further includes display means for displaying the respective priorities of the identifiers.

For instance, the predetermined identical processing is integration of the listed files according to the respective priorities of the identifiers.

For instance, the predetermined identical processing is copying of the listed files according to the respective priorities of the identifiers.

For instance, the predetermined identical processing is movement of the listed files according to the respective priorities of the identifiers.

Preferably, the document management system further includes means for displaying the listed files according to the respective priorities of the identifiers.

Preferably, the identifiers are marks.

To attain the above object, according to a third aspect of the invention, there is provided a storage medium storing a program for executing a document management method of managing a plurality of files of documents by recording the plurality of files of documents such that the files can be retrieved, the program comprising:

a document file listing module for listing attribute information of recorded ones of the plurality of files, information of results of retrieval carried out on the files, and information of indices for the files, on a file-by-file basis, in a single document file list;

an identifier assigning module for assigning identifiers having respective priorities independent of the results of the retrieval to a plurality of files listed in the single document file list, that are desired to be subjected to a predetermined identical processing; and a processing execution module for subjecting the listed files to which the identifies having the respective priorities are assigned, to the predetermined identical processing according to the respective priorities of the identifiers.

Preferably, the control program further includes a display module for displaying the respective priorities of the identifiers.

For instance, the predetermined identical processing is integration of the listed files according to the respective priorities of the identifiers.

For instance, the predetermined identical processing is copying of the listed files according to the respective priorities of the identifiers.

For instance, the predetermined identical processing is movement of the listed files according to the respective priorities of the identifiers.

Preferably, the control program further includes a module for displaying the listed files according to the respective priorities of the identifiers.

Preferably, the identifiers are marks.

Preferably, the storage medium is a floppy disk.

Preferably, the storage medium is a hard disk.

Preferably, the storage medium is an optical disk.

Preferably, the storage medium is a magneto-optical disk.

Preferably, the storage medium is a CD-ROM (Compact Disk Read Only Memory).

Preferably, the storage medium is a CR-R (Compact Disk Recordable).

Preferably, the storage medium is a magnetic tape.

Preferably, the storage medium is a nonvolatile memory card.

Preferably, the storage medium is a ROM (Read Only Memory).

BRIEF DESCRIPTION OF THE DRAWINGS

FIG. 18 is a diagram useful in explaining the document list used in the document management system according to the first embodiment;

FIG. 19 is a diagram useful in explaining the document list used in the document management system according to the first embodiment;

FIG. 20 is a diagram useful in explaining the document list used in the document management system according to the first embodiment;

FIG. 21 is a diagram useful in explaining the document list used in the document management system according to the first embodiment;

FIG. 23 is a diagram useful in explaining the document list used in the document management system according to the first embodiment;

FIG. 25 is a diagram showing an example of a document list displayed when priority discrimination marks are assigned to files by the document management system according to the first embodiment;

FIG. 26 is a diagram showing an example of the document list displayed when priority discrimination marks are assigned to files by the document management system according to the first embodiment;

FIG. 29 is a diagram useful in explaining the document list used in the document management system according to the second embodiment;

FIG. 31 is a diagram useful in explaining a document list used in a document management system according to a third embodiment of the invention;

FIG. 32 is a diagram useful in explaining the document list used in the document management system according to the third embodiment;

FIG. 34 is a diagram useful in explaining the document list used in the document management system according to the third embodiment; and FIG. 35 is a diagram useful in explaining the document list used in the document management system according to the third embodiment.

DETAILED DESCRIPTION OF PREFERRED EMBODIMENTS

The present invention will now be described in detail with reference to the drawings showing embodiments thereof.

First Embodiment

First, a first embodiment of the invention will be described with reference to FIGS. 3 to 27.

Figure 3:
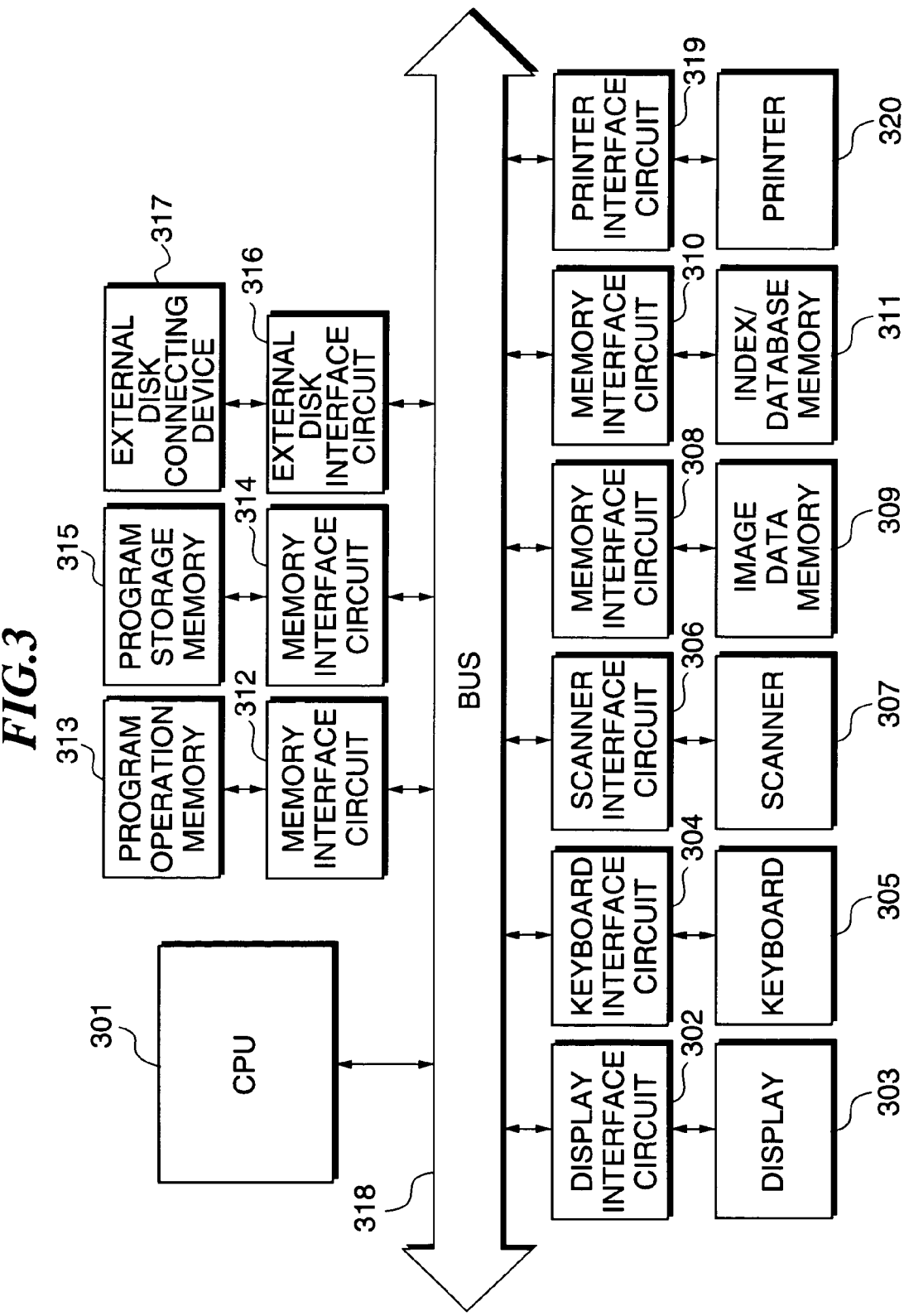
FIG. 3 is a block diagram showing the hardware arrangement of a document management system according to a first embodiment of the present invention.

FIG. 3 is a block diagram showing the hardware arrangement of a document management system according to the first embodiment of the invention. In the figure, reference numeral 301 designates a CPU (Central Processing Unit) as control means for controlling the whole document management system according to the present embodiment. The CPU 301 is connected to a bus 318 as information transmission means for transmitting image information and instruction information for instructing operations. Reference numeral 303 designates a display comprised of a CRT (Cathode Ray Tube) as output means for displaying images according to image information, document lists and so forth. The display 303 is connected to the bus 318 via a display interface circuit 302. Reference numeral 305 designates a keyboard including a pointing device, as instruction information input means, which is used by the user for inputting instruction information for instructing operations to be executed by the document management system. The keyboard 305 is connected to the bus 318 via a keyboard interface circuit 304.

Reference numeral 307 designates a scanner as image information input means for reading image information from an object (original). The scanner 307 is connected to the bus 318 via a scanner interface circuit 306. Reference numeral 309 designates an image data memory as recording means which is comprised of a magnetic disk or a magnetic optical disk for storing pieces of image information and pieces of identification information for managing the pieces of image information, respectively. The image data memory 309 is connected to the bus 318 via a memory interface circuit 308. Reference numeral 311 designates an index/database memory as recording means which records a database storing various pieces of index information input by the user and image identification information correlated respectively with the index information. The index/database memory 311 is connected to the bus 318 via a memory interface circuit 310.

Reference numeral 313 designates a program operation memory formed by a RAM (Random Access Memory) or the like, which is used during execution of a program for executing document management by the document management system according to the present embodiment. The program operation memory 313 is connected to the bus 318 via a memory interface circuit 312. Reference numeral 315 designates a program storage memory comprised of a magnetic disk or a magnetic optical disk and storing the program executed by the document management system according to the present embodiment. The program storage memory 315 is connected to the bus 318 via a memory interface circuit 314. Reference numeral 317 designates an external disk connecting device, such as a disk drive, for connecting a floppy disk or the like storing the program executed by the document management system according to the present embodiment, to the system. The external disk connecting device 317 is connected to the bus 318 via an external disk interface circuit 316. Reference numeral 320 designates a printer for printing image information, document lists and the like stored in the document management system according to the present embodiment. The printer 320 is connected to the bus 318 via a printer interface circuit 319.

Normally, in the hardware constructed as above, the program for realizing the document management system is provided from a floppy disk or the like as storage means. The program on the floppy disk is read from the external disk connecting device 317 before the use (execution) of the program, and stored in the program storage memory 315. Then, the program is read into the program operation memory 313 and executed by the CPU 301.

Figure 4:
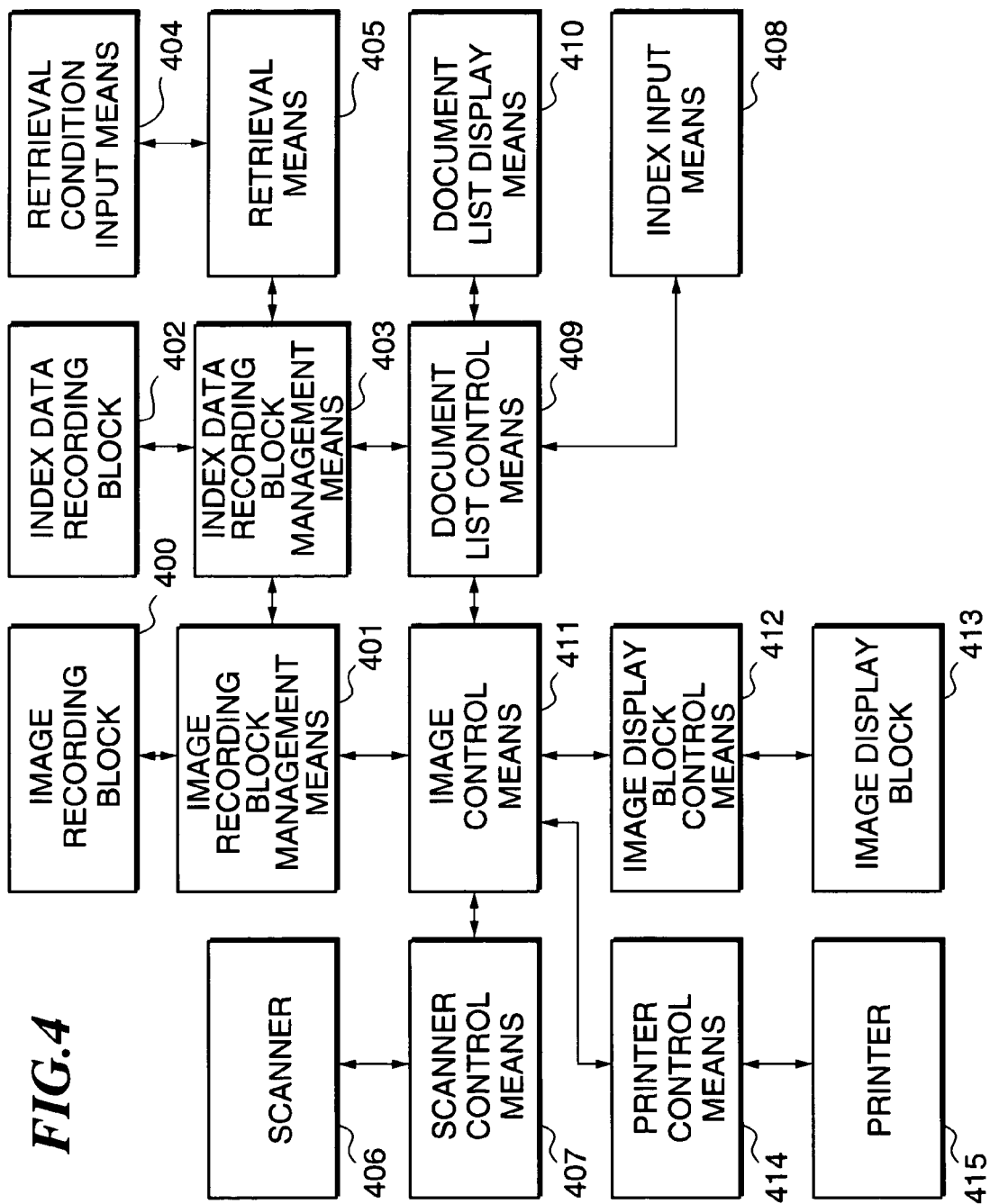
FIG. 4 is a diagram showing the arrangement of software-based data processing components of the document management system according to the first embodiment.

FIG. 4 shows the arrangement of software-based data processing components of the document management system according to the present embodiment. In the figure, reference numeral 400 designates an image recording block for recording image information as document information. Reference numeral 401 designates an image recording block management means for managing data recorded in the image recording block 400 such that the consistency of the data is maintained. Reference numeral 402 designates an index data (index information) recording block for recording index information for use in retrieval of image information as document information. Reference numeral 403 designates index data (index information) recording block management means for managing data recorded in the index data recording block 402 such that the consistency of the data is maintained. Reference numeral 404 designates a retrieval condition input means for inputting a retrieval condition for retrieving a desired document, which is formed by the keyboard and a retrieval condition input screen.

Reference numeral 405 designates a retrieval means (generally referred to as the "search engine") for retrieving image information as information of a desired document. Reference numeral 406 designates a scanner for reading image information from an original. Reference numeral 407 designates a scanner control means for controlling the scanner 406. Reference numeral 408 designates an index input means for inputting index data (index information). Reference numeral 409 designates a document list control means for controlling a document list display means 410, referred to hereinafter, for displaying a list of documents (document list). Reference numeral 410 designates the document list display means which is generally comprised of a CRT and a control circuit for controlling the CRT. Reference numeral 411 designates an image control means for controlling image information as document information. Reference numeral 412 designates an image display block control means for controlling an image display block 413, referred to hereinafter. Reference numeral 413 designates the image display block for displaying image information as document information. Reference numeral 414 designates a printer control means for controlling a printer 415, referred to hereinafter. Reference numeral 415 designates the printer for printing image information as document information on recording paper.

The document list control means 409 which controls the document list display means 410 is connected to the index data recording block management means 403, the image control means 411, and the index input means 408. The image control means 411 is connected to the image recording block management means 401, the document list control means 409, the scanner control means 407, and the image display block control means 412. The printer control means 414 is connected to the image control means 411.

Next, description will be made of operations of an image information retrieval process for retrieving image information as document information, a newly recording process for newly recording image information as document information, and an input process for inputting index information, which are carried out by the document management system constructed as above, with reference to FIG. 4 and flowcharts shown in FIGS. 5 and 6.

(Operation of the Image Information Retrieval Process for Retrieving Image Information as Document Information)

The user inputs a retrieval condition for retrieving image information as information of a desired document by using the retrieval condition input means 404. The retrieval condition may be a keyword, for instance. The retrieval condition input via the retrieval condition input means 404 is input to the retrieval means 405. The retrieval means 405 finds out image information as document information fulfilling the retrieval condition input by the retrieval condition input means 404, from a document database, by way of the index data recording block management means 403 managing data in the index data recording block 402, and then outputs information indicative of results of the retrieval to the document list control means 409. The document list control means 409 produces a document list based on the information indicative of the results of the retrieval, and displays the document list on the document list display means 410.

Figure 5:
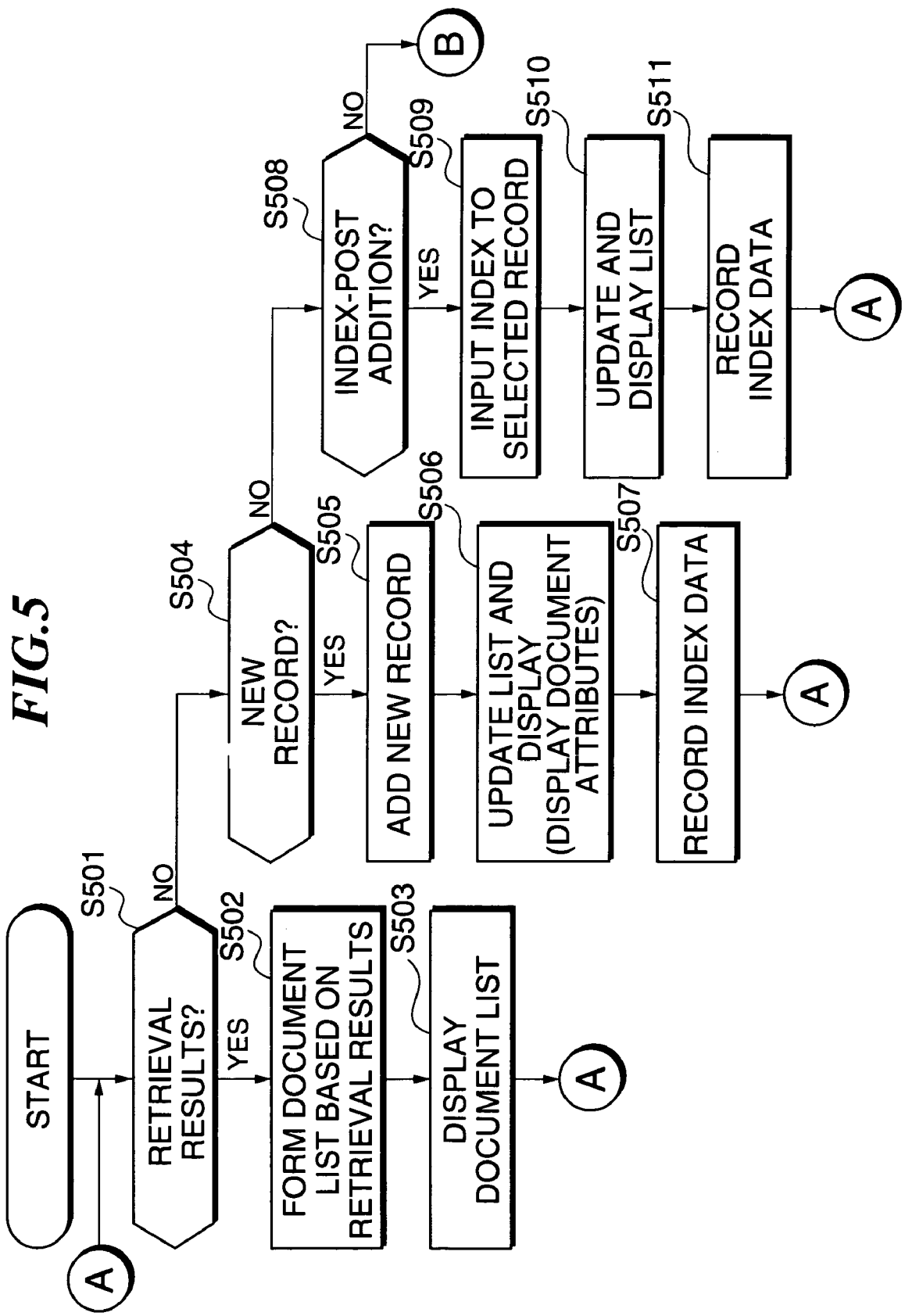
FIG. 5 is a flowchart showing a flow of an operation carried out by document list control means of the document management system according to the first embodiment.

Referring to FIG. 5, a flow of the operation of the image information retrieval process executed by the document management system will be described: First, at a step S501, it is determined based on information indicative of results of a retrieval carried out by the retrieval means 405 whether or not image information as document information is stored in the document database, which fulfills the retrieval condition. If it is determined that image information as document information fulfilling the retrieval condition is stored in the document database, the program proceeds to the next step S502, wherein the document list control means 409 produces a document list based on the information indicative of the results of the retrieval by the retrieval means 405. Then, at a step S503, the document list produced by the document list control means 409 at the step S502 is displayed on the document list display means 410, followed by the program returning to the step S501.

On the other hand, if it is determined at the step S501 that no image information as document information fulfilling the retrieval condition is stored, the program proceeds to a step S504 to carry out the newly recording process at the step S504 and steps S505 to S507.

(Operation of the Newly Recording Process)

The user starts the scanner control means 407 to cause the scanner 406 to read a new document (original). The scanner 406 reads a predetermined number of sheets of the original, and delivers image information obtained by reading the original to the image control means 411. The image control means 411 causes the image information received from the scanner 406 to be recorded in the image recording block 400 by way of the image recording block management means 401, and at the same time generates and delivers new document generation information to the document list control means 409.

The document list control means 409 creates a new record (file) based on the new document generation information delivered from the image control means 411, and adds the new record to the document list already displayed on the document list display means 410, to display the new record as part of the document list on the document list display means 410. In this record are displayed document attributes, such as an entry date determined at the time of execution of the scanning and the number of pages, which correspond to the image information as document information input from the scanner 406. The document attributes updated as above are recorded in the index data recording block 402 via the index data recording block management means 403.

Referring to FIG. 5, a flow of the operation of the newly recording process executed by the document management system will be described: It is determined at the step S504 whether or not a new record is input. If it is determined that a new record is input, the program proceeds to the next step S505, wherein the new record is added to the document list. Then, at the step S506, the document list is updated and displayed on the document list display means 410 (the document attributes are displayed). Next, the program proceeds to the step S507, wherein index information is recorded in the index data recording block 402, followed by the program returning to the above step S501.

On the other hand, if it is determined at the step S504 that no new record is input, the program proceeds to a step S508 to carry out an index post-addition process at the step S508 and steps S509 to S511.

(Operation of the Index Post-Addition Process)

The user instructs the document list control means 409 to start inputting index information, more specifically, post-addition of index information, i.e. addition of index information after a record of image information is created. The document list control means 409 is set to a mode of receiving output from the index input means 408 in response to this instruction. Then, the user inputs predetermined index information (for the newly-scanned document described above, in the present example) by using the index input means 408. The index information input via the index input means 408 is displayed at a predetermined location on the document list displayed on the document list display means 410, by the document list control means 409. Further, the index information input via the index input means 408 is recorded in the index data recording block 402, via the index data recording block management means 403, automatically or in response to an instruction issued by the user to the document list control means 409.

Referring to FIG. 5, a flow of the operation of the index post-addition process executed by the document management system will be described: It is determined at the step S508 whether or not index information is input for post-addition, i.e. for addition to a record of image information produced in advance. If it is determined that index information is input for the post-addition, the program proceeds to the next step S509, wherein the index information is input to the selected record. Then, at a step S510, the document list is updated and the index information is displayed on the document list display means 410. Next, at a step S511, the index information is recorded in the index data recording block 402, followed by the program returning to the above step S501. On the other hand, if it is determined at the step S508 that no index information is input for post-addition, the program proceeds to a step S512 appearing in FIG. 6 to carry out an index pre-addition process at the step S512 and S513 to S516.

(Operation of the Index Pre-Addition Process)

Now, description will be made of the index pre-addition process for inputting index information prior to inputting of image information as document information.

The user instructs the document list control means 409 to start index pre-addition, i.e. addition of index information to a new record prior to inputting of image information. In response to this instruction, the document list control means 409 permits index information not correlated with any image data at the present time point, to be input to a new record at the lowest portion of the document list. Then, the user inputs new index information via the index input means 408. This index information is displayed on the document list displayed on the document list display means 410, by the document list control means 409, and recorded as required in the index data recording block 402 via the index data recording block management means 403.

Figure 6:
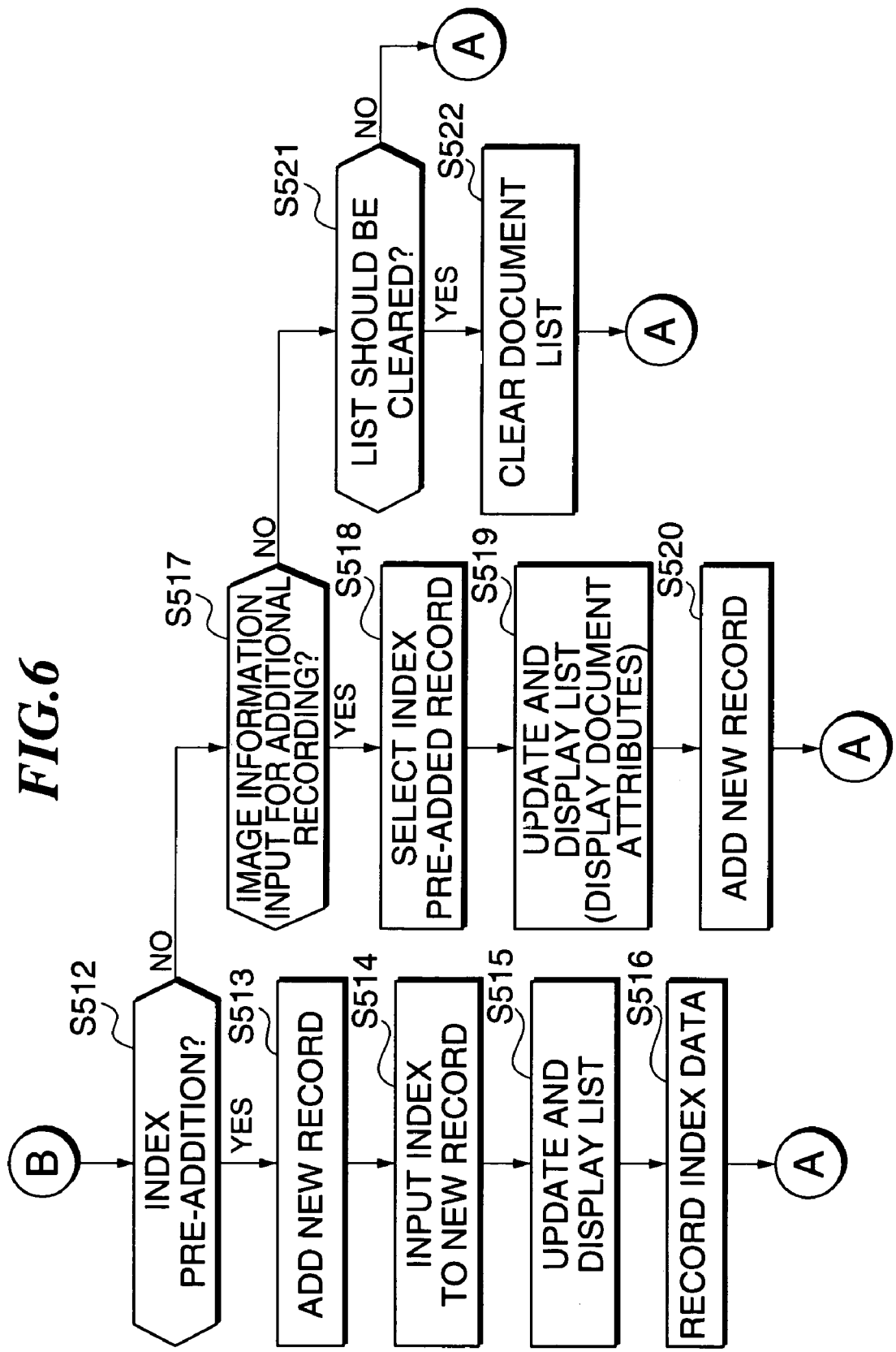
FIG. 6 is a flowchart showing a continued part of the flow of an operationcarried out by the document list control means of the document management system according to the first embodiment.

Referring to FIG. 6, a flow of the operation of the index pre-addition process executed by the document management system will be described: It is determined at the step S512 whether or not index information is input for pre-addition, i.e. addition of index information prior to inputting of image information. If it is determined that index information is input for pre-addition, the program proceeds to the next step S513 where a new record is added to the document list. Then, at a step S514, the index information is input to the new record. Next, at a step S515, the document list is updated and displayed on the document list display means 410. Then, the program proceeds to a step S516, wherein the index information is recorded in the index data recording block 402, followed by the program returning to the step S501 in FIG. 5.

On the other hand, if it is determined at the step S512 that no index information is input for pre-addition, the program proceeds to a step S517 in FIG. 6 to carry out an image information-recording process for recording image information in a record formed by index pre-addition at the step S517 and steps S518 to S520.

(Operation of the Image Information-Recording process for recording image information in a record formed by index pre-addition)

The user can now input image information corresponding to the record formed by the index pre-addition.

First, the user instructs the document list control means 409 to select a record formed by index pre-addition before inputting of image information. Next, the scanner 406 is controlled by the scanner control means 407 to read image information from an original. The image control means 411 sends the image information read by the scanner 406 to the image display block 413 via the image display block control means 412, for display, and at the same time sends the same via the image recording block management means 401 to the image recording block 400, for recording therein. The image recording block 400 sends address information of the image recorded therein via the image control means 411 or directly to the document list control means 409. Further, information, such as the number of pages of the document, read by the scanner 406 is sent from the image control means 411 to the document list control means 409. The document list control means 409 causes the information received from the image control means 411 to be recorded in the index data recording block 402 by way of the index data recording block management means, and at the same time, changes the status of the corresponding record on the document list from the index pre-added record to a normal document. Further, the document list control means 409 updates the document list displayed on the document list display means 410.

The document management system may be configured such that the address information of the image recorded in the image recording block 400 is sent from the image recording block management means 401 directly to the index data recording block management means 403.

Referring to FIG. 6, a flow of the operation of the image information-recording process executed by the document management system for recording image information in a record formed by index pre-addition will be described: It is determined at a step S517 whether or not image information is input for additional recording. If it is determined that image information is input for additional recording, the program proceeds to the next step S518 wherein an index pre-added record is selected. Then, at a step S519, the document list is updated (the document attributes are updated), and displayed on the document list display means 410. Next, at a step S520, a new record is added, followed by the program returning to the step S501 in FIG. 5.

On the other hand, if it is determined at the step S517 that no image information is input for additional recording, the program proceeds to a step S521 in FIG. 6 to carry out a document list-clearing process at the step S521 and steps S522 to S522.

More specifically, at a step S521, it is determined whether or not clearing of the document list is instructed. If it is determined that clearing of the document list is instructed, the program proceeds to the next step S522, wherein the document list is cleared, followed by the program returning to the step S501 in FIG. 5. On the other hand, if it is determined at the step S521 that clearing of the document list is not instructed, the program skips over the above step S522 to return to the step S501 in FIG. 5.

(Operation of an Image Information-Displaying/Printing Process)

The user can select a desired file from the document list, display the image information of the file on the document list display means 410, and print the image information by using the printer 415.

When the user selects a desired file from the document list, and issues an instruction for displaying the image information of the file on the display 303 (see FIG. 3) via the keyboard 305 (see FIG. 3) or the like, the document list control means 409 obtains retrieval information for retrieving image information of the selected file, from the index data recording block 402, via the index data recording block management means 403. Next, the document list control means 409 sends to the image control means 411 the retrieval information for retrieving the image information and instruction information for instructing the displaying of the image information. Based on the retrieval information received from the document list control means 409, the image control means 411 obtains the image information from the image recording block 400 by way of the image recording block management means 401, and sends the image information thus obtained to the image display block control means 412. The image display block control means 412 causes the image display block 413 to display the image information received from the image control means 411.

Similarly, in a printing process for printing the image information by the printer 415, the document list control means 409 sends to the image control means 411 retrieval information for retrieving image information selected by the user and instruction information for instructing the printing of the image information. Based on the retrieval information received from the document list control means 409, the image control means 411 obtains the image information from the image recording block 400 via the image recording block management means 401, and sends the image information thus obtained to the printer control means 414. The printer control means 414 causes the printer 415 to print and output the image information received from the image control means 411.

Next, the operations described above will be described in further detail.

(Construction of a Document List)

Figure 7:
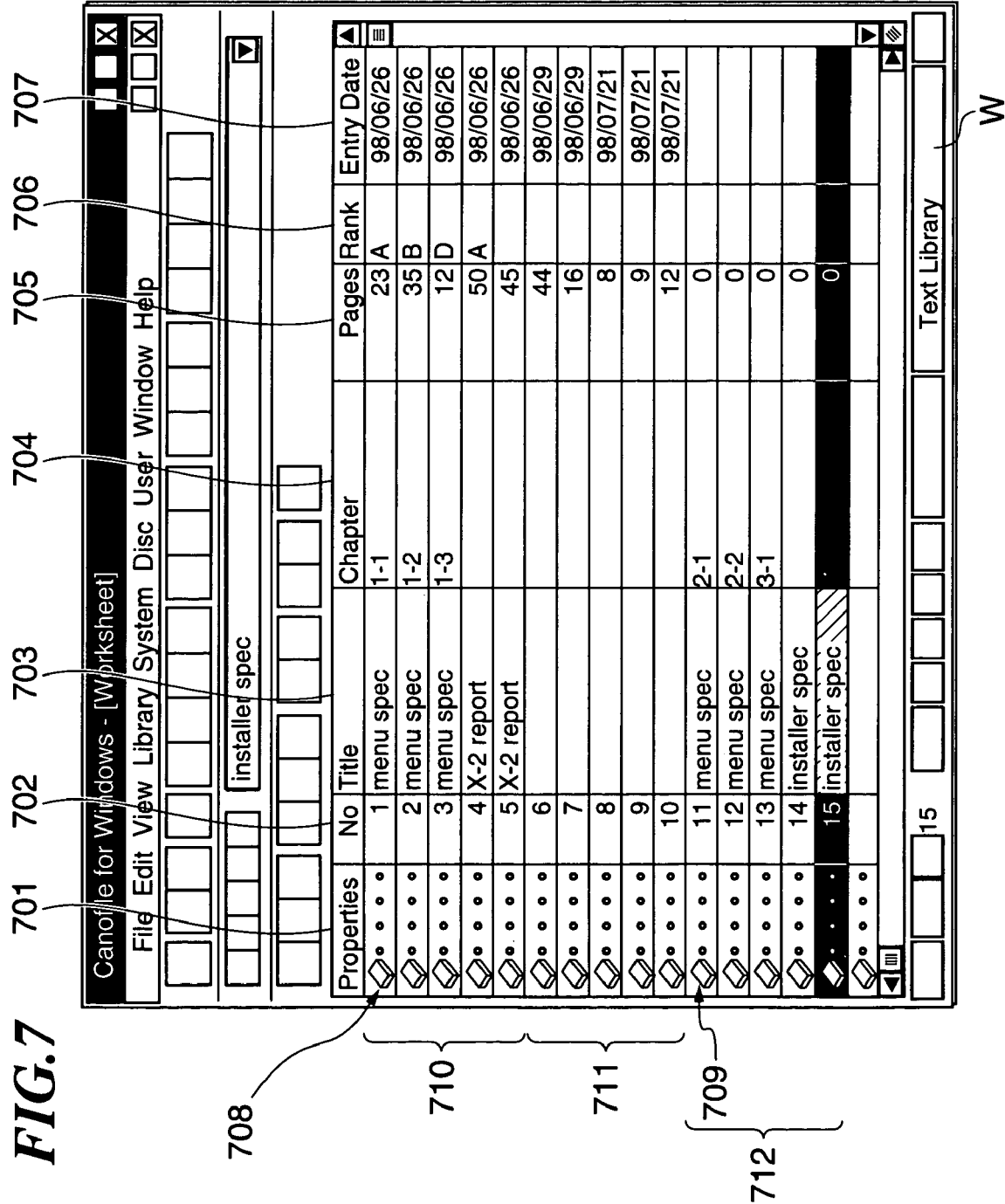
FIG. 7 is a diagram useful in explaining a document list used in the document management system according to the first embodiment.

FIG. 7 shows the appearance of a document list used in the document management system according to the present embodiment. In the figure, a symbol "W" designates the document list. The document list W is generated by the document list control means 409, and displayed on the document list display means 410. On the document list W, there are displayed files as results of retrieval and new files input from the scanner 406.

In FIG. 7, reference numeral 701 designates a column of properties showing states of files, reference numeral 702 designates a column of file numbers showing numbers assigned to the files on the document list W, and reference numerals 703, 704 designate columns of index entries of each document. Reference numeral 705 designates the number of pages of each file, and reference numeral 707 designates a column of entry date showing a date on which image information of each object was recorded by the scanner 406. As to the columns of index entries 703 and 704, the user can freely design the index entries according to the kinds of documents by using database construction-setting means, not shown. In the FIG. 7 example, titles of documents, chapters of documents, and ranks showing evaluations of documents are provided, respectively, in the columns 703, 704 and a column 706 as index information for use in document management. Further, the order of items in each of these columns can be changed as desired.

On the document list W shown in FIG. 7, files having image information recorded therein and index pre-added files to which only pieces of index information are input prior to inputting of image information are shown on the same screen such that they can be clearly discriminated from each other. Reference numerals 708, 709 designate icons each showing a state of each file in the column of properties 701. The icons 708 each show that image information has already been recorded in the file, whereas the icons 709 each show that image information is not yet recorded in the file, that is, the file is an index pre-added file.

In the FIG. 7 document list W, files assigned with file numbers "1" to "10" in ranges indicated by respective reference numerals 710, 711 are files having image information recorded therein, and files assigned with file numbers "11" to "15" in a range indicated by reference numeral 712 are index pre-added files.

Figure 8:
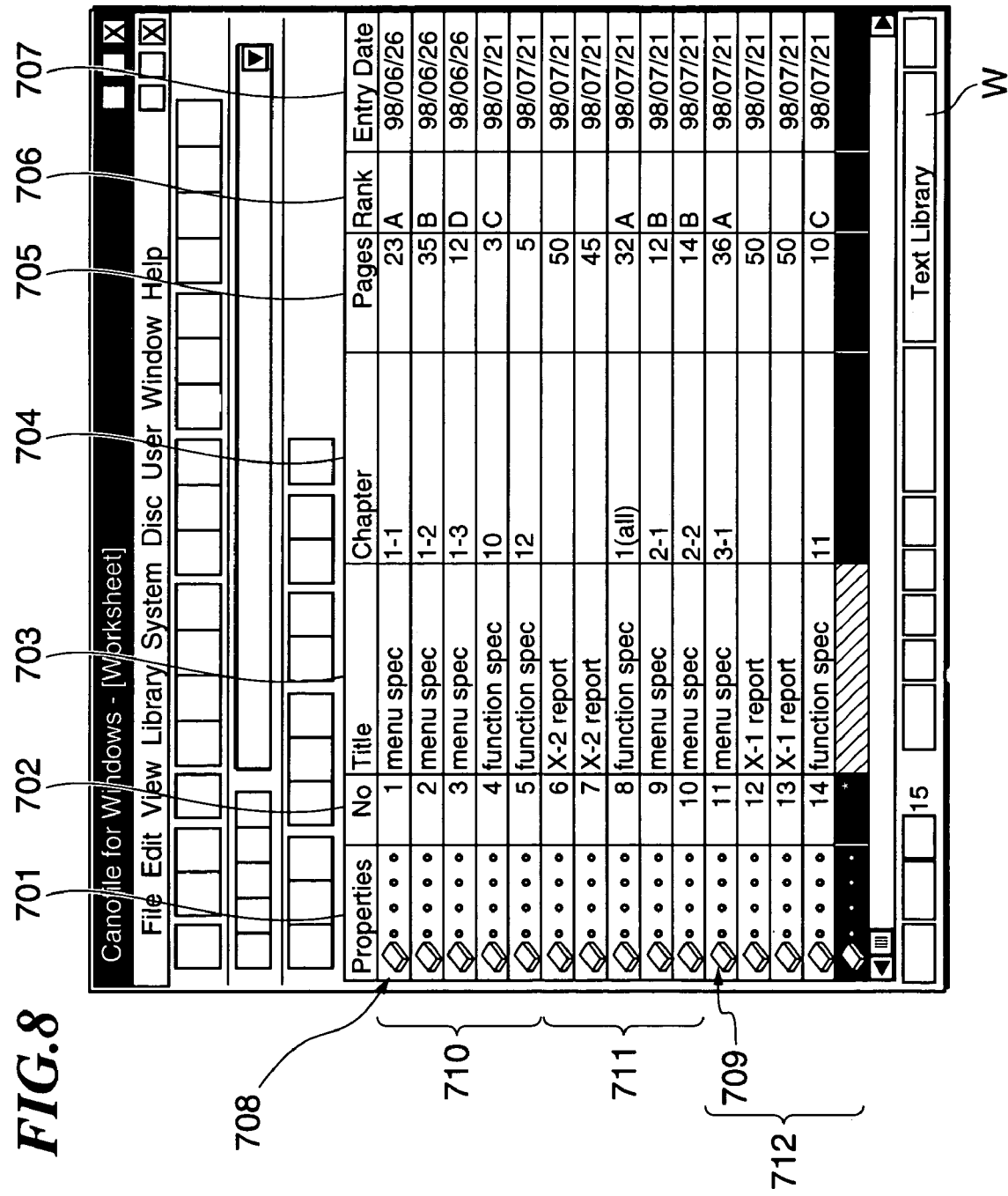
FIG. 8 is a diagram useful in explaining the document list of used in the document management system according to the first embodiment.

Further, the files in the range designated by reference numeral 710 are indicative of existing files having image information and index information recorded therein which are retrieved by the retrieval means 405 and displayed on the image display block 413, the files in the range designated by reference numeral 711 are indicative of new files having image information recorded therein but having no index information recorded therein, and the files in the range designated by reference numeral 712 are indicative of index pre-added files having only index information recorded therein. FIG. 8 shows the appearance of the document list W after retrieval operations are executed for some items in the FIG. 7 document list W. FIG. 8 shows a state of the document list W in which are displayed all the items of image information as document information stored after the retrieval operations are executed without providing any retrieval condition. FIG. 8 exemplifies an initial state of the list which is useful in explaining the retrieval operation.

In FIG. 8, portions corresponding to those of the document list in FIG. 7 are indicated by identical reference numerals.

In the state of the FIG. 8 document list W, when a letter "A" as in the rank column 706 is input by the user to the retrieval condition input means 404 as a retrieval condition, the retrieval means 405 finds out, based on the retrieval condition, records (files) fulfilling the retrieval condition from the index data recording block 402 via the index data recording block management means 403. Then, the retrieval means 405 outputs information indicative of results of the retrieval to the document list control means 409. The document list control means 409 produces a document list based on the information indicative of the results of the retrieval, and displays the produced document list on the document list display means 410.

Figure 9:
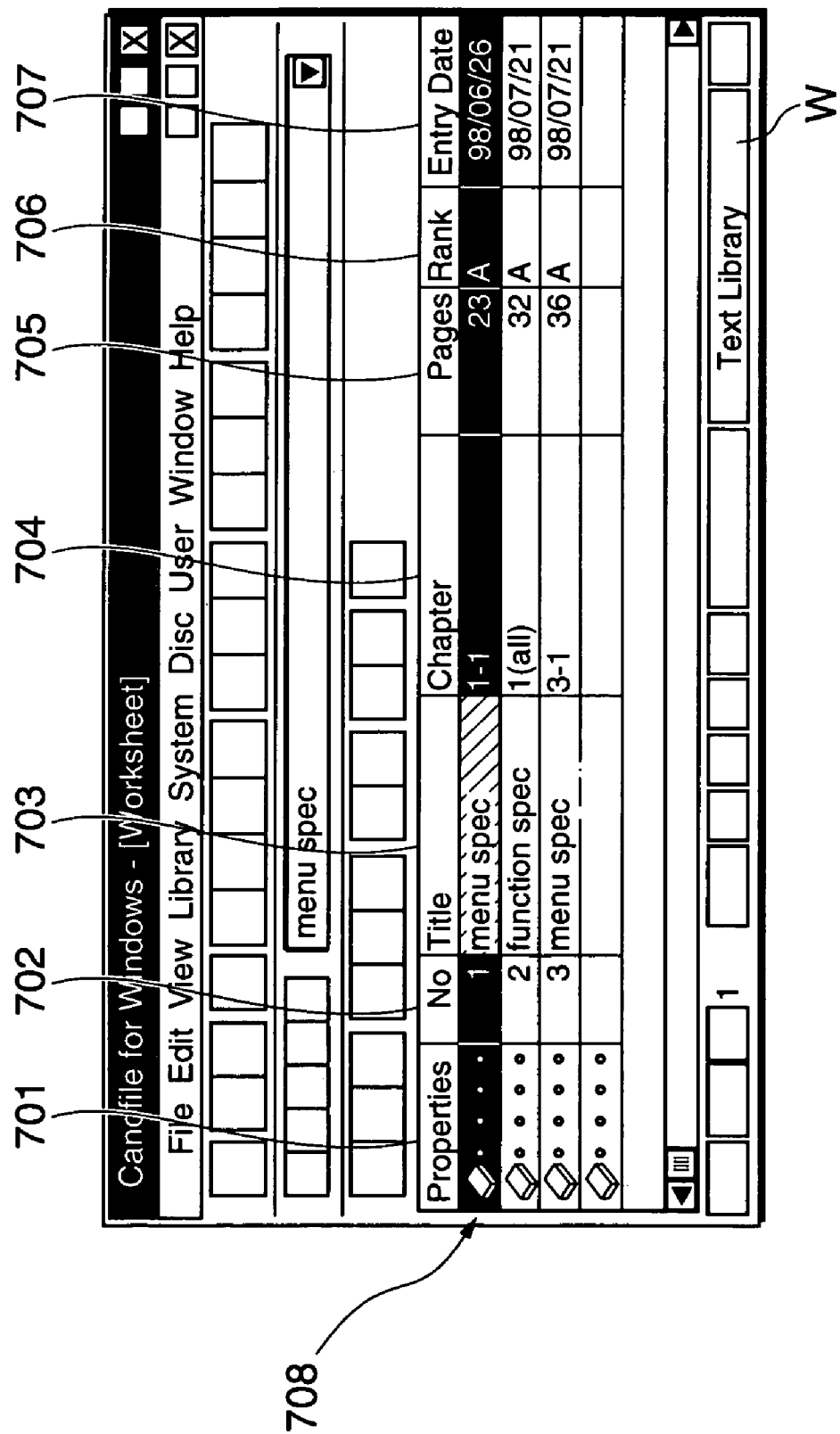
FIG. 9 is a diagram useful in explaining the document list used in the document management system according to the first embodiment.

FIG. 9 shows the appearance of the document list W which is produced by the retrieval operation described above and displayed on the document list display means 410. In the figure, portions of the document list corresponding to those of the FIG. 7 document list are indicated by identical reference numerals.

(Operation of the Newly Recording Process)

Figure 10:
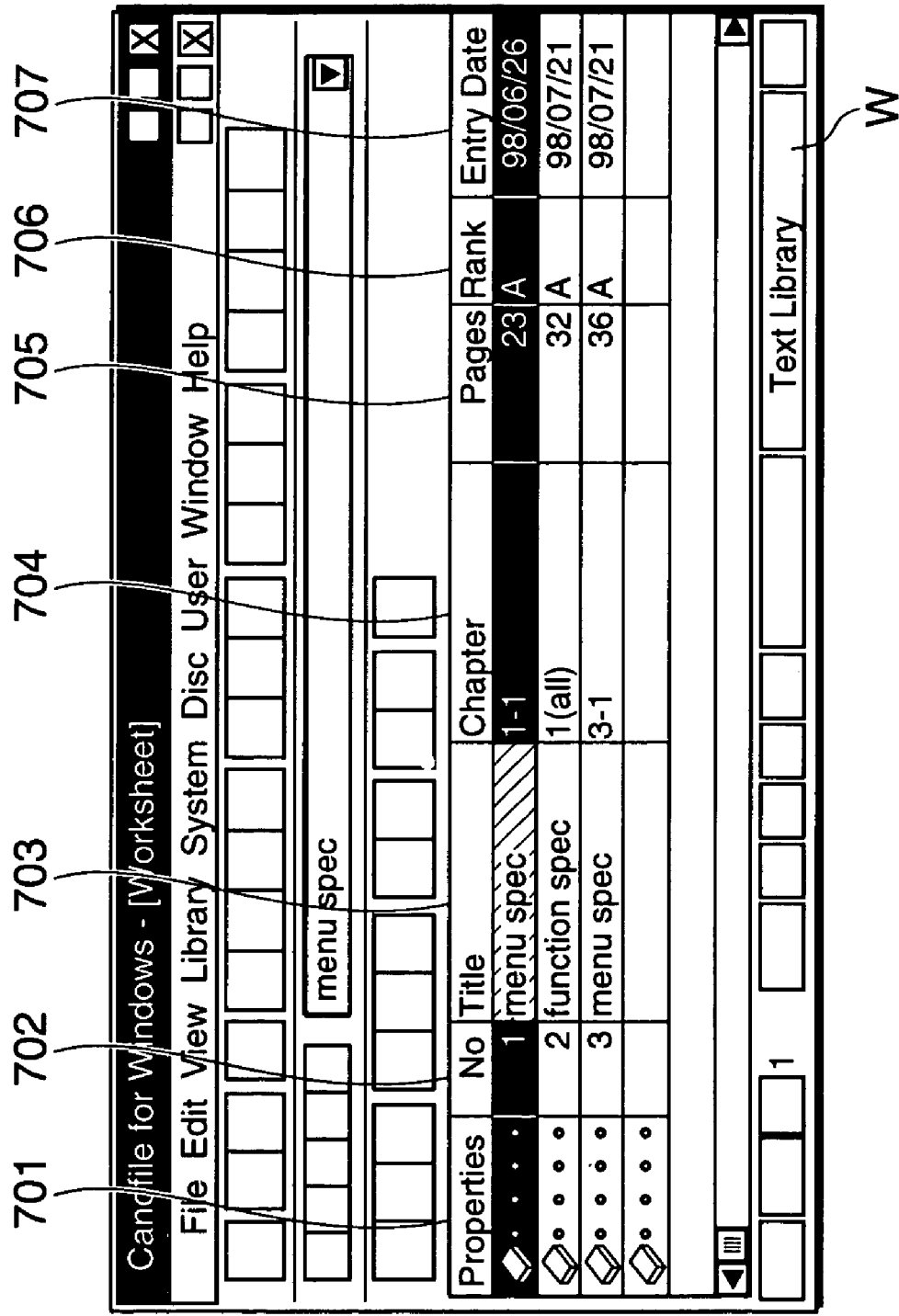
FIG. 10 is a diagram useful in explaining the document list used in the document management system according to the first embodiment.
Figure 11:
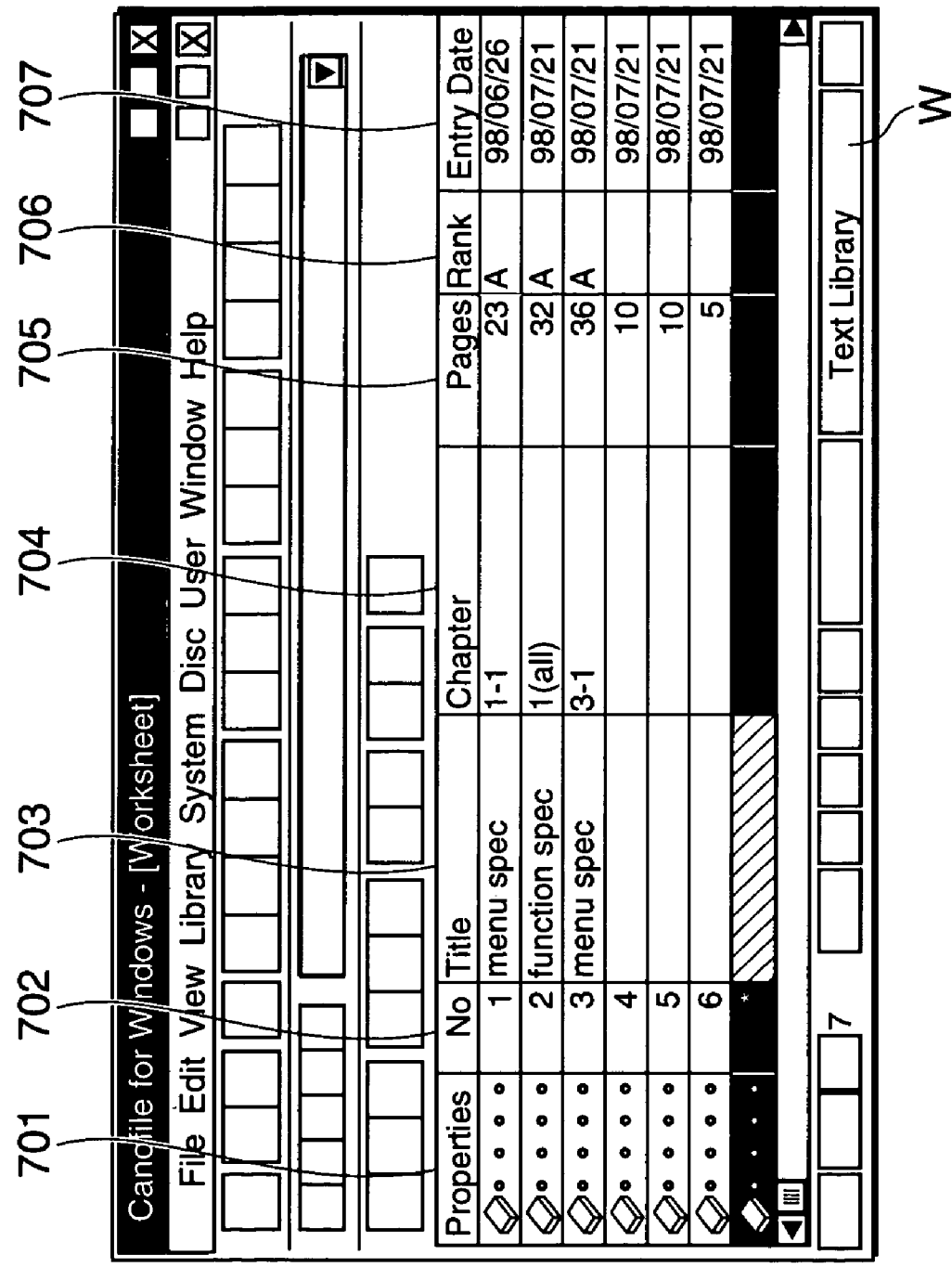
FIG. 11 is a diagram useful in explaining the document list used in the document management system according to the first embodiment.

FIGS. 10 and 11 are views useful in explaining how the document list W is changed when the newly recording process is carried out in the state of the FIG. 9 document list. FIG. 10 shows a state of the document list W before execution of the newly recording process. In this state, a new document (original) is read by using the scanner 406, and the resulting new document generation information is notified to the document list control means 409. The document list control means 409 produces a new record based on the notified information, and adds the produced new record to the document list already displayed on the image display block 413, to display the new record added in the document list. Document attributes produced and updated are recorded in the index data recording block 402 via the index data recording block management means 403.

FIG. 11 shows the appearance of the document list W which has been changed by the new document-recording operation described above and displayed on the document list display means 410. On the document list W, records (files) assigned with file numbers "4", "5", and "6" have been newly produced, and the numbers of pages, entry dates, icons in the column of properties indicating the attributes of the files, all of which correspond to scanned image information, are displayed.

(Operation of the Index Post-Addition Process)

Figure 12:
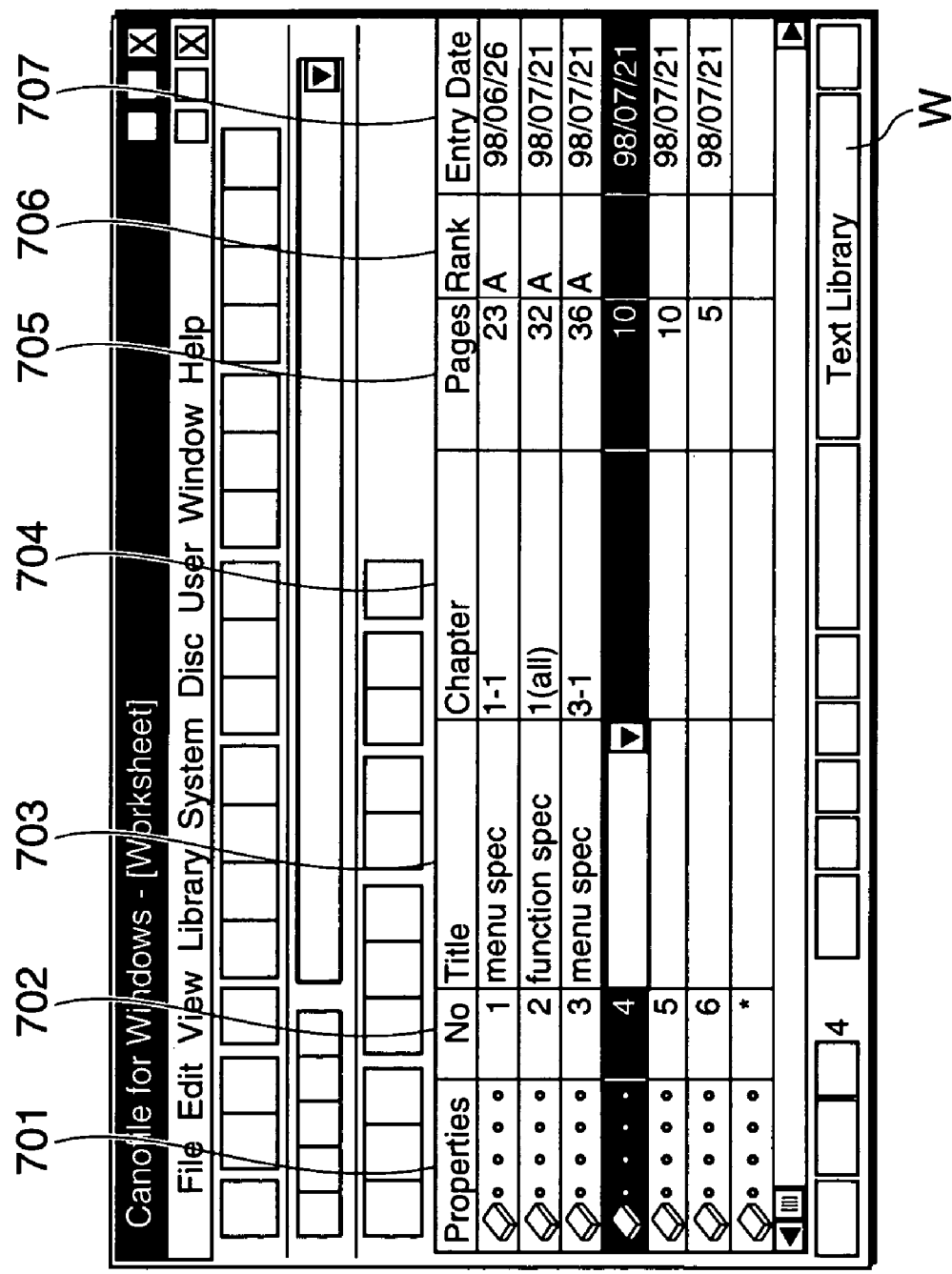
FIG. 12 is a diagram useful in explaining the document list used in the document management system according to the first embodiment.
Figure 13:
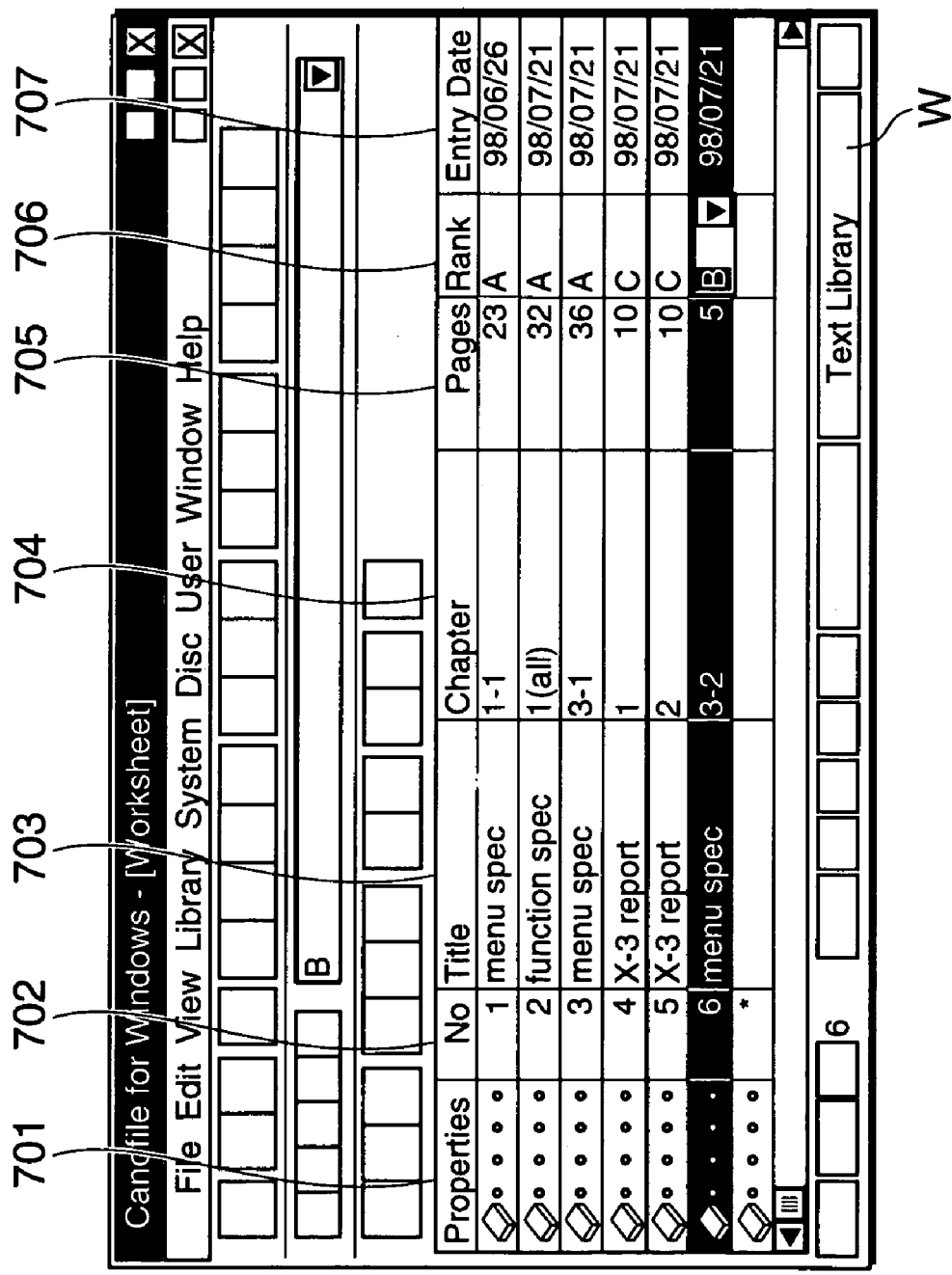
FIG. 13 is a diagram useful in explaining the document list used in the document management system according to the first embodiment.

FIGS. 12 and 13 are views useful in explaining how the document list W is changed when the index post-addition process is carried out in the state of the FIG. 11 document list. The user instructs the document list control means 409 to start inputting of index information. In response to this instruction, the document list control means 409 is set to a mode of receiving output from the index input means 408. Then, the user inputs predetermined index information via the index input means 408. The document list control means 409 causes the index information input via the index input means 408 to be displayed at a predetermined location on the document list W displayed on the document list display means 410. The input index information is recorded in the index data recording block 402 for recording, via the index data recording block management means 403, automatically or in response to an instruction from the user to the document list control means 409.

After the input operation for inputting the index information to one index entry box has been completed, it is possible to proceed to an input operation for inputting index information to a next index entry box (e.g. to an adjacent index entry box on the right side thereof in FIG. 12). Similarly, after an input operation for inputting index information to one record (file) has been completed, it is also possible to proceed to an input operation for inputting index information to a next record (file) (e.g. to a row immediately under the one record (file) in FIG. 12). For instance, the example illustrated in FIG. 12 shows a case in which inputting of index information is started from a box of the title column for File No. 4, as shown in FIG. 12, and is continued up to a box of the rank column for File No. 6, as shown in FIG. 13.

Further, it is also possible to continuously input index information only to columns (e.g. only the chapter and rank columns) designated for inputting of the index information.

(Operation of the Index Pre-Addition Process)

Figure 14:
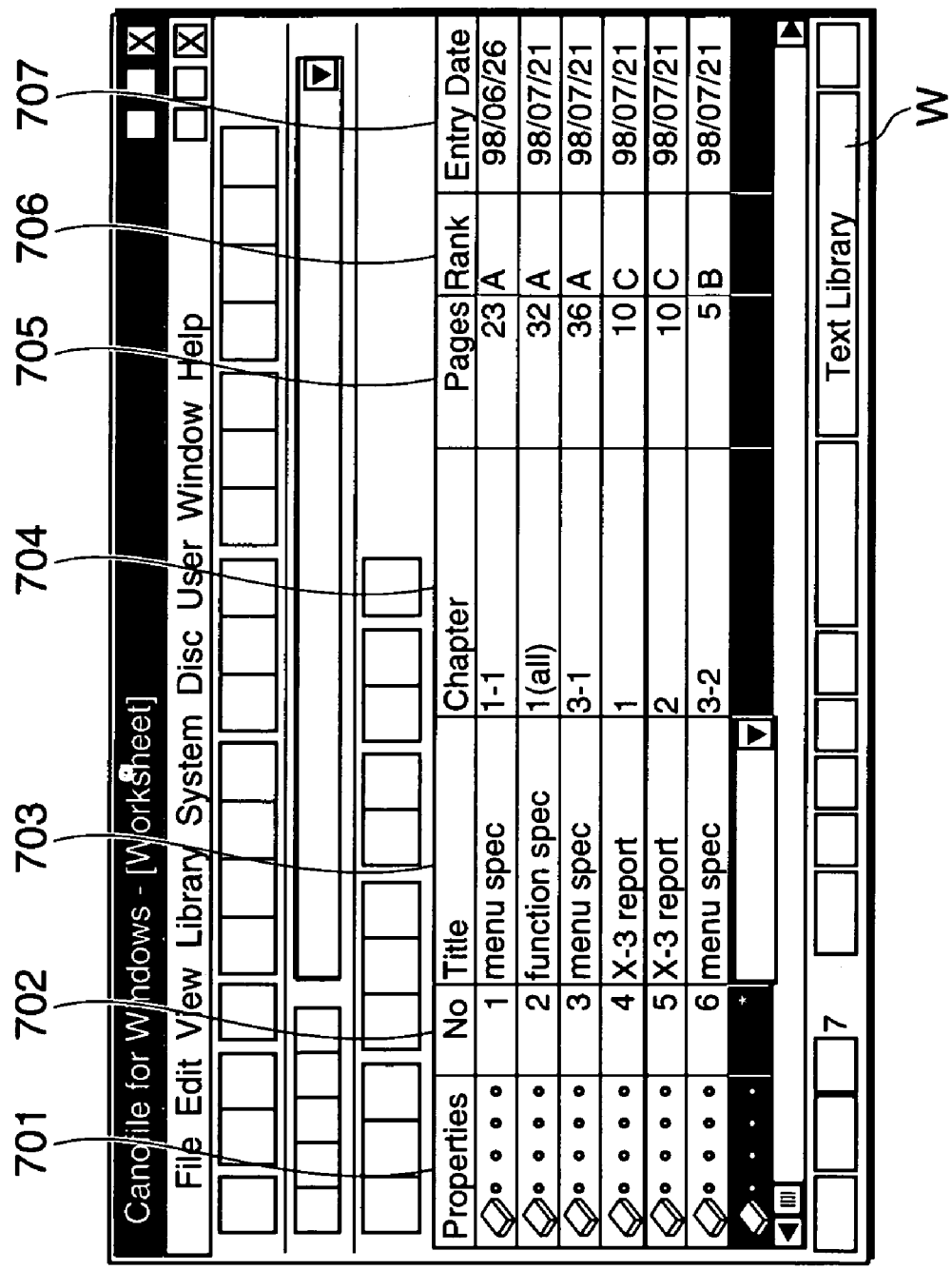
FIG. 14 is a diagram useful in explaining the document list used in the document management system according to the first embodiment.
Figure 15:
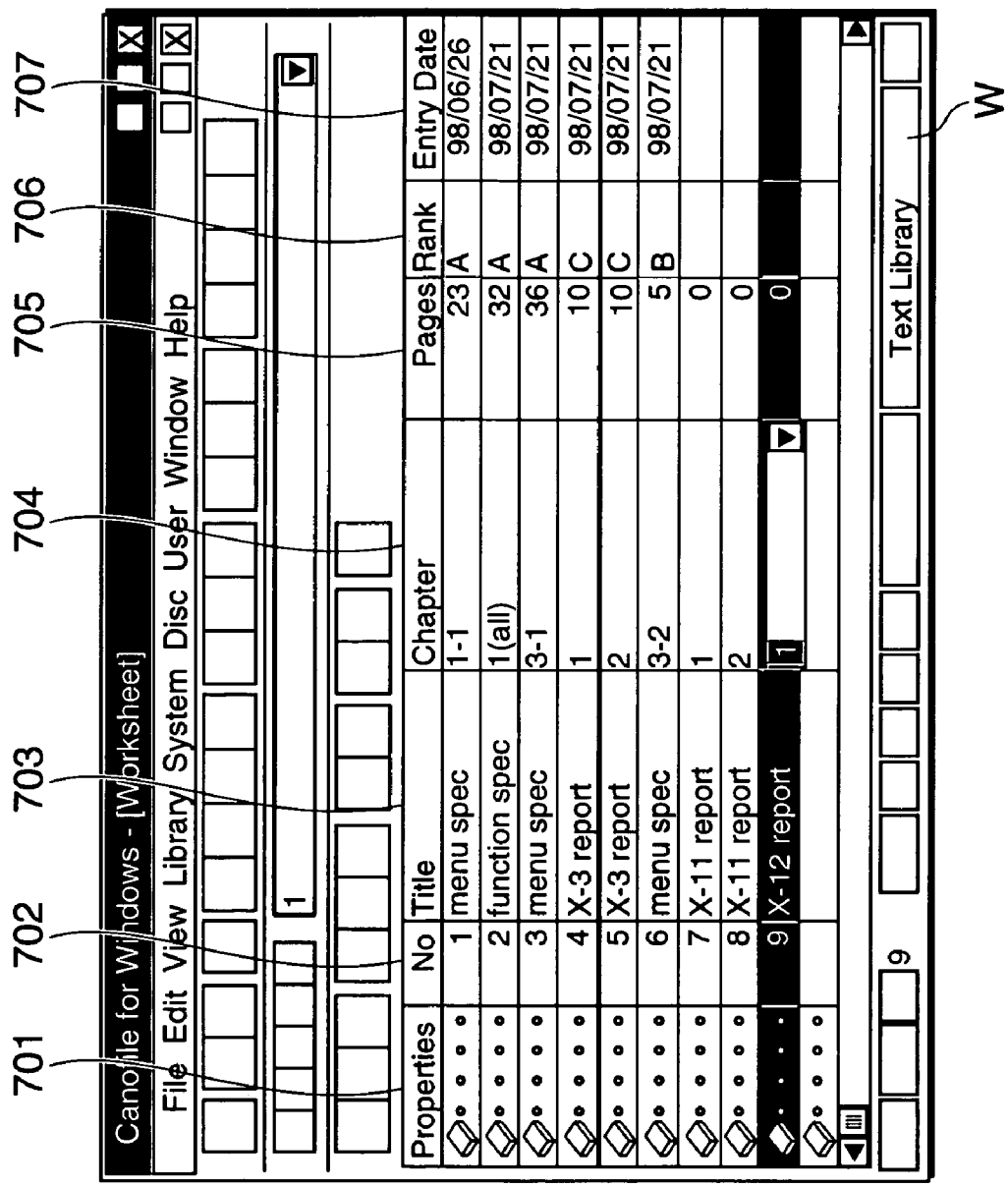
FIG. 15 is a diagram useful in explaining the document list used in the document management system according to the first embodiment.

FIGS. 14 and 15 are views useful in explaining how the document list W is changed when the index pre-addition process is carried out in the state of the FIG. 13 document list. The user instructs the document list control means 409 to prepare for inputting of index information before entry of image information. In response to this instruction, the document list control means 409 enables index information not correlated with any image information at the present time point, to be input to a new record at the lowest portion of the document list, as shown in FIG. 14. Then, the user inputs new index information via the index input means 408. This index information is displayed on the document list W displayed on the document list display means 410, by the document list control means 409, and sent as required, to the index data recording block 402 for recording via the index data recording block management means 403.

When an input operation for inputting index information to one index entry box is completed, it is possible to proceed to an input operation for inputting index information to a next index entry box. Similarly, when an input operation for inputting index information to one record (file) is completed, it is also possible to proceed to an input operation for inputting index information to another record (file). At this time, a file which is not correlated with image information is formed as an index pre-added file. For instance, the example illustrated in FIGS. 14 and 15 shows a case in which inputting of index information is started from a box of the title column for a new file, as shown in FIG. 14, and is continued up to a box of the chapter column for File No. 9, as shown in FIG. 15. In this example, index pre-added files assigned with Files Nos. 7, 8, and 9 are formed.

(Operation of a Process for Recording of an Image in an Index Pre-Added Record)

Figure 16:
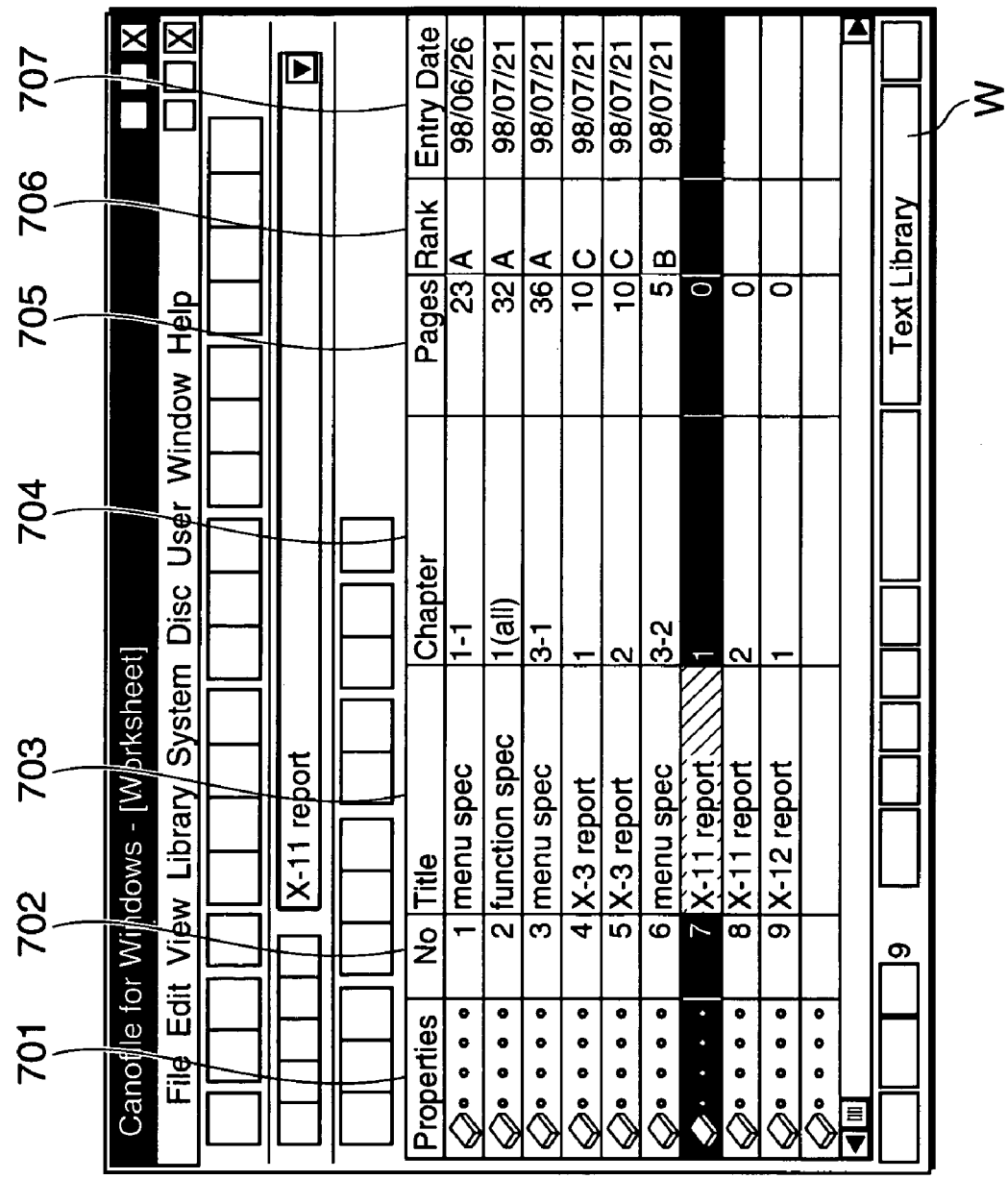
FIG. 16 is a diagram useful in explaining the document list used in the document management system according to the first embodiment.
Figure 17:
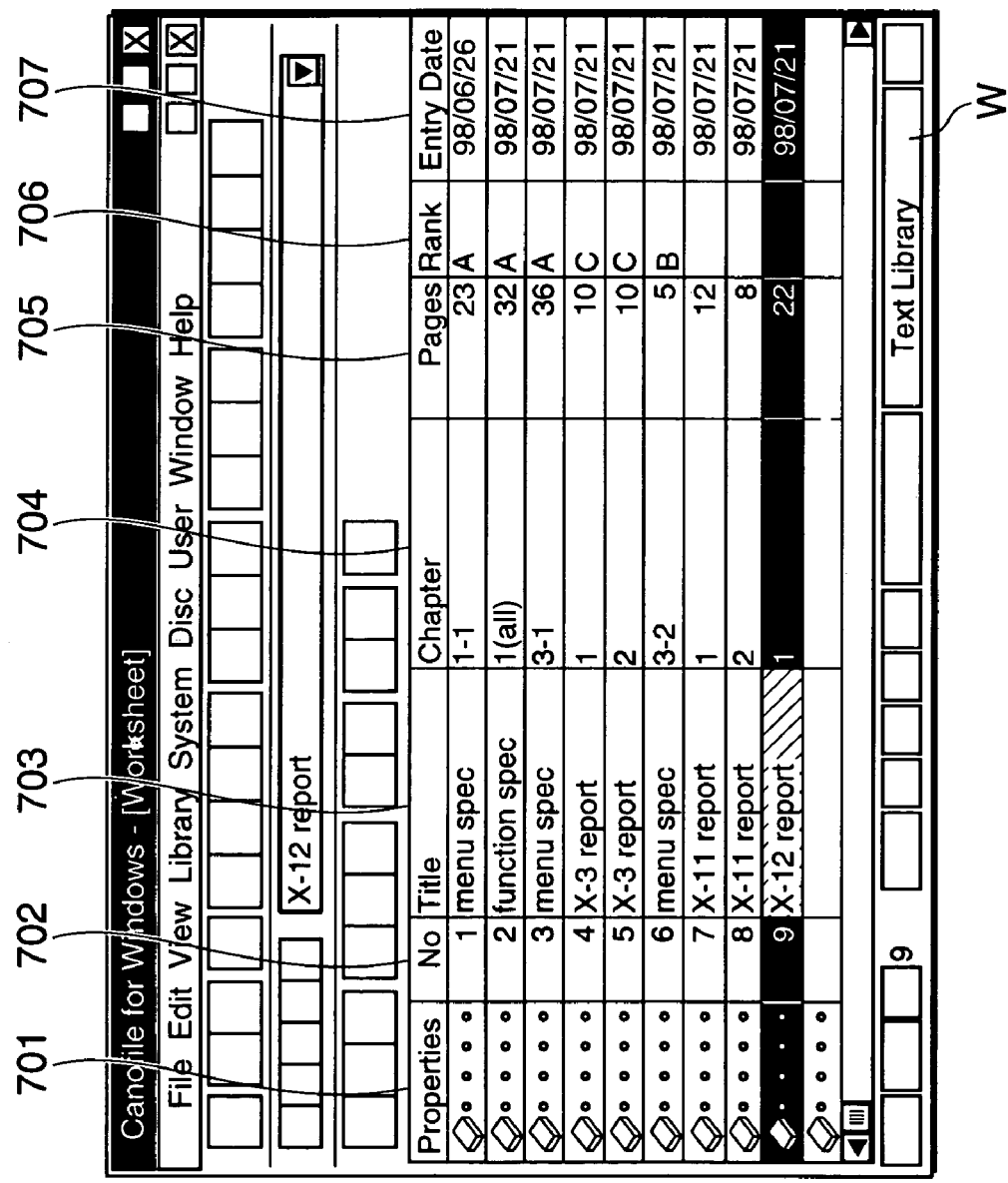
FIG. 17 is a diagram useful in explaining the document list used in the document management system according to the first embodiment.

FIGS. 16 and 17 are views useful in explaining how the document list W is changed when the process of recording of image information in an index pre-added file (having index information entered before entry of image information) is carried out in the state of the FIG. 15 document list. The user carries out an input operation of instructing the document list control means 409 to select an index pre-added record to which image information is to be input. Then, the scanner 406 is controlled by the scanner control means 407 to read image information. The image information read by the scanner 406 is sent by the image control means 411 via the image display block control means 412 to the image display block 413, and at the same time sent to the image recording block management means 401 to be recorded in the image recording block 400. The image recording block 400 supplies address information of the image recorded therein via the image control means 411 or directly to the document list control means 409.

Further, information, such as the number of pages of a document, read by the scanner 406 is sent from the image control means 411 to the document list control means 409. The document list control means 409 sends the information received from the image control means 411, via the index data recording block management means 403 to the index data recording block 402 for recording therein, and at the same time changes the status of a corresponding record on the document list from the index pre-added record to a normal document. Further, the document list control means 409 updates the display of the document list displayed on the document list display means 413.

FIG. 17 shows the appearance of the document list W which has been finally changed by the above described new document-recording operation. On the document list W, image information has been input to files assigned with Files Nos. 7, 8, and 9, and the display of the numbers of pages, entry dates, and icons in the properties column indicative of the attributes of the files have been updated.

In the following, an example will be described in which desired files in the above document lists W are each provided beforehand with a discrimination mark indicative of a priority of processing, and a processing operation is collectively carried out on the files provided with the discrimination marks indicative of priorities of processing.

Hereinafter, the discrimination marks indicative of priorities of processing will be referred to as the "priority discrimination marks". The priority discrimination marks are attached to files, and attachment and removal of the marks to and from the files can be carried out collectively.

FIG. 18 shows a typical example of a document list W in which files desired to be collectively processed are retrieved and displayed in a scattered manner. On the document list W, discrimination marks ★ 72a indicative of a high priority and discrimination marks ■ 72b indicative of a low priority are displayed in the column of properties of a plurality of files desired to be processed. These priority discrimination marks 72a, 72b are used to determine the processing order of the plurality of files when they are sequentially processed.

FIGS. 19 to 27 show document lists W in which a plurality of files desired to be integrated into one are retrieved and displayed in a scattered manner, and are useful in explaining an operation for integrating the files.

In the FIG. 19 document list W, priority discrimination marks 72 ① to ⑤ each having a numerical value indicative of a degree of priority are entered to boxes of the column of properties for files to be integrated. The files having the priority discrimination marks attached thereto are similar to chapters of one book, for instance. If it is desired to arrange in one file these files, which are separately registered on the document list W, the following integrating operation is carried out.

In the conventional file integration operation, files are integrated with one at a higher location in the document list W being given a higher priority such that in the present example, they are integrated into one file in the order of Files Nos. 1→3→5→8→9.

On the other hand, according to the present embodiment, files with priority discrimination marks 72 are integrated into File No. 3 which is ranked at Rank A (hereinafter referred to as (A)-File No. 3) and provided with the priority discrimination mark ① indicative of the highest degree of priority. FIG. 20 shows a result of integration in which the files with the priority discrimination marks 72 in the FIG. 19 document list are integrated into one file.

Figure 22:
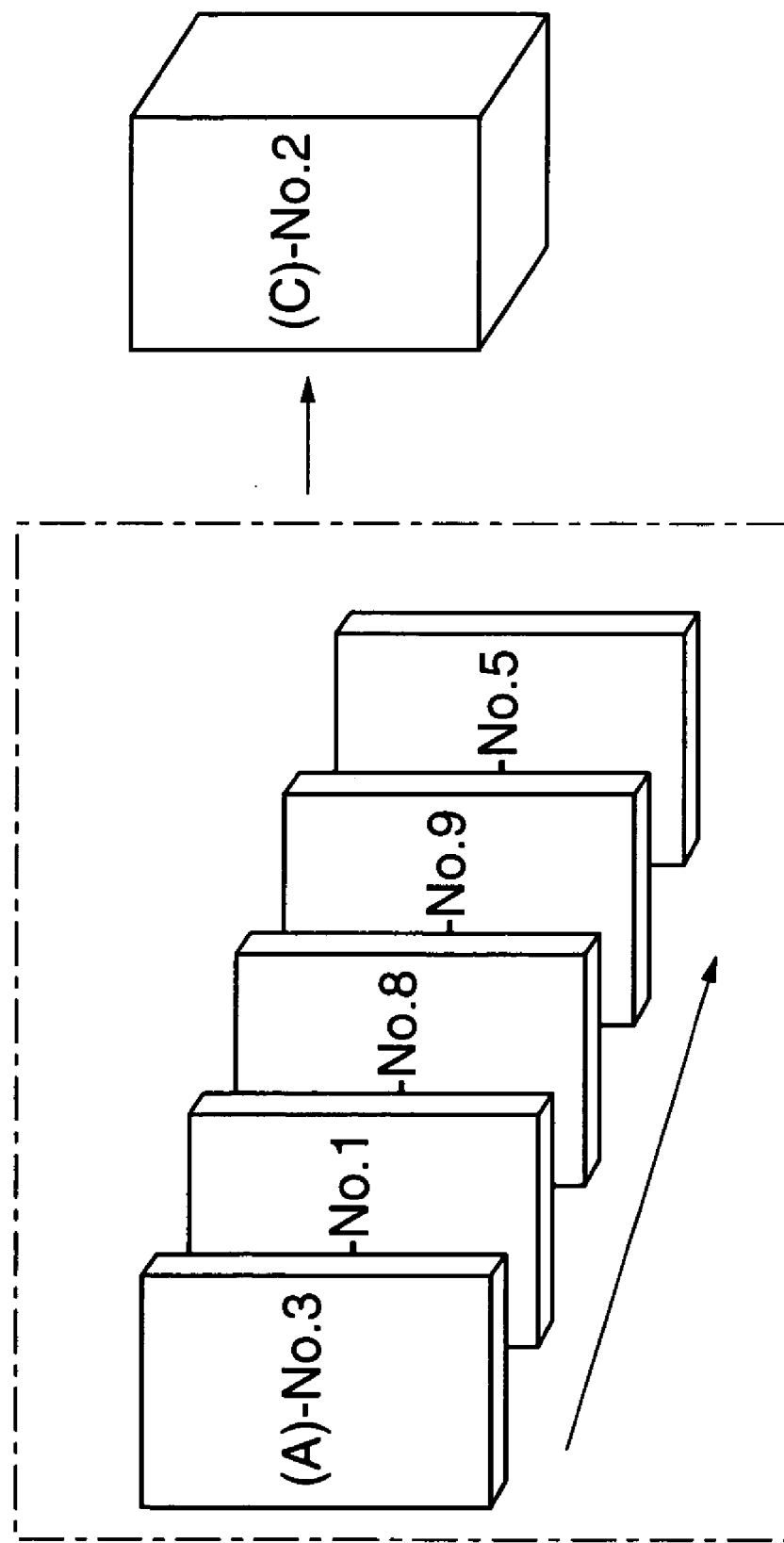
FIG. 22 is a diagram useful in explaining the document list used in the document management system according to the first embodiment.

Further, FIGS. 21, 22, and 23 show how files provided with the priority discrimination marks 72 are integrated into one file. an order of integration of them, and a document list W after execution of integration, respectivel FIG. 21 shows the left side portion of a document list W as representing files on the document list, and illustrates that Files Nos. 1, 3, 5, 8, and 9, which are desired to be integrated, are selected and integrated into one file as (C)-File No. 2 shown in FIG. 23.

FIG. 22 shows a state of (C)-File No. 2 (File No. 2 at Rank C) which is formed as a result of integration of the above five files according to their priorities. This (C)-File No. 2 is formed by integrating the five files into one file according to the order of the priority discrimination marks ① to ⑤, that is, the order of Files Nos. 3→1→8→9→5. As the result of the integration, numbers 36, 23, 8, 22, and 10 of pages included in the respective files are added together, whereby the (C)-File No. 2 becomes a file of 99 pages.

FIG. 23 shows a document list W obtained by execution of the integration. In the figure, File No. 2 is a file formed as the result of the integration, and the number of pages of the file is shown as "99".

Next, an operation of providing files with priority discrimination marks by the document management system according to the present embodiment will be described with reference to FIG. 24.

Figure 24:
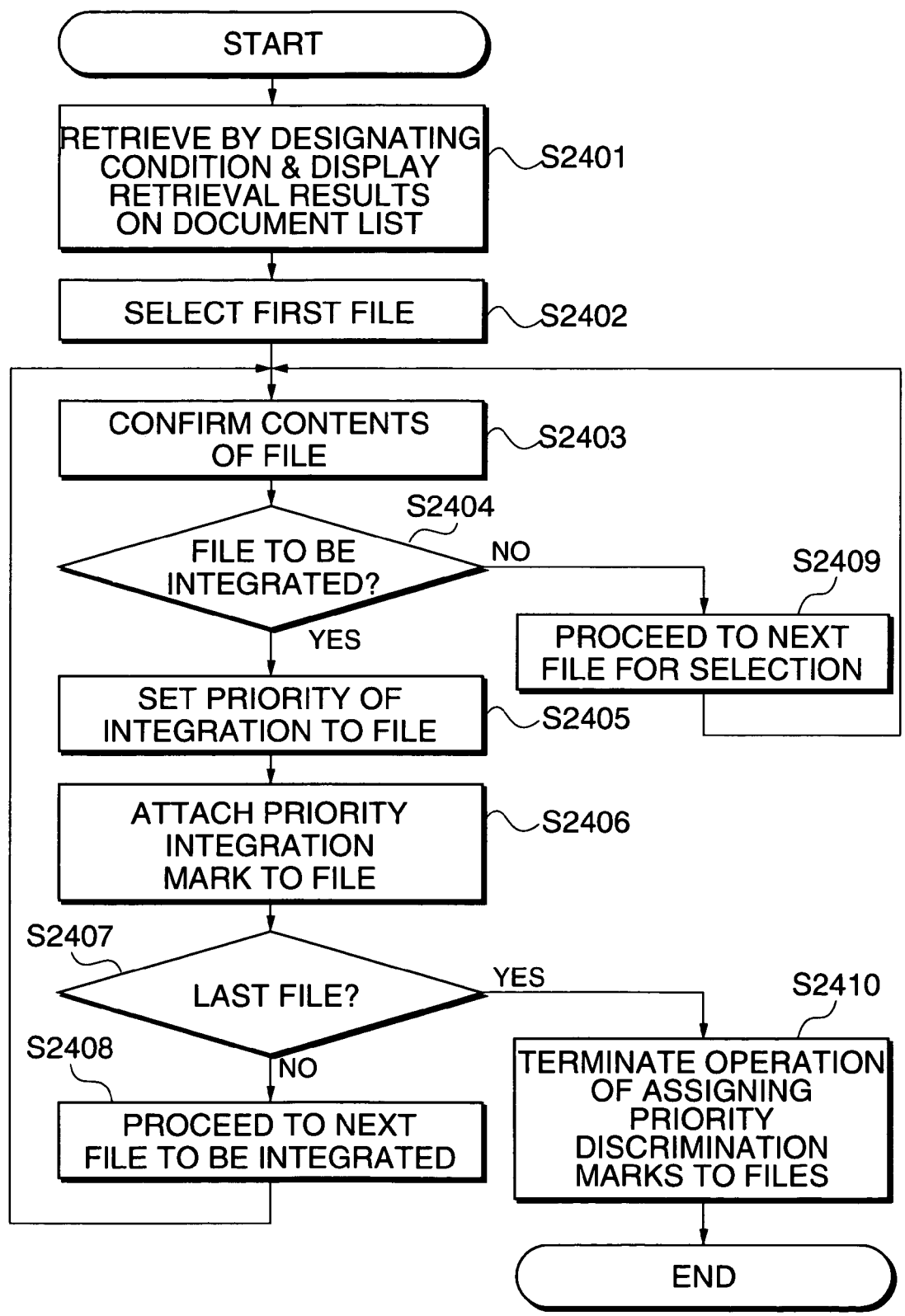
FIG. 24 is a flowchart showing a flow of an operation of assigning priority discrimination marks to files, carried out by the document management system according to the first embodiment.

FIG. 24 is a flowchart showing a flow of an operation of assigning priority discrimination marks to files by the document management system according to the first embodiment.

First, at a step S2401, files obtained as results of retrieval are displayed on the document list W by the document list display means 410, and at the next step S2402, a first file on the document list W is selected. Then, at a step S2403, contents of the file are confirmed, and at the next step S2404, it is determined based on the contents of the file whether or not the file is one to be integrated. If it is determined that the file is to be integrated, the order in which the file is to be integrated is decided at a step S2405 to assign a priority of integration to the file. Next, at a step S2406, a priority discrimination mark 72 having a number indicative of the set priority is attached to the file. Then, it is determined at a step S2407 whether or not the present operation has been carried out up to the last file on the document list W. If it is determined that the present operation has not been carried out up to the last file, a file desired to be integrated next is selected at the next step S2408, followed by the program returning to the above step S2403.

If it is determined at the above step S2404 that the file is not to be integrated, a file desired to be integrated next is selected at a step S2409, followed by the program returning to the above step S2403.

Further, if it is determined at the above step S2407 that the present operation has been carried out up to the last file, the operation of assigning priority discrimination marks to files is completed at a step S2410, followed by terminating the present process.

In FIG. 24, a priority for file integration can be determined immediately after confirmation of contents of a file. However, there can be a case in which a priority for file integration has not been definitely determined when a priority discrimination mark 72 is to be attached to a file. In the following, such a case will be described.

As shown in FIGS. 19 to 23, when discrimination marks each having a numerical value indicative of a priority are attached to files, it is impossible to set the numerical value if the priority has not yet been determined before the operation, or if a file desired to be integrated is found after the operation. In such a case, when a priority discrimination mark 72 is to be attached to the present file, if another file having the same priority as the present file is found, other files having priorities lower than the same priority are automatically lowered in priority.

The operation in the above case will be described with reference to FIGS. 25 and 26.

A document list W shown in FIG. 25 contains Files Nos. 1, 3, 5, 8, and 9 assigned with priority discrimination marks having numbers indicative of respective priorities which are displayed in respective boxes of the column of priority, as shown in FIG. 25. If it is required that File No. 4 is newly added to the above files for integration, and a discrimination mark with a priority ③ is attached to File No. 4, files having respective priority discrimination marks ③, ④, ⑤ lower in position than File No. 4 are automatically lowered in priority and displayed with the lower priorities. The resulting state is shown in FIG. 26. Thus, the priority of each priority discrimination mark 72 can be set such that the serial number indicative of its priority is increased or decreased when the priority discrimination mark is attached to a file.

Figure 27:
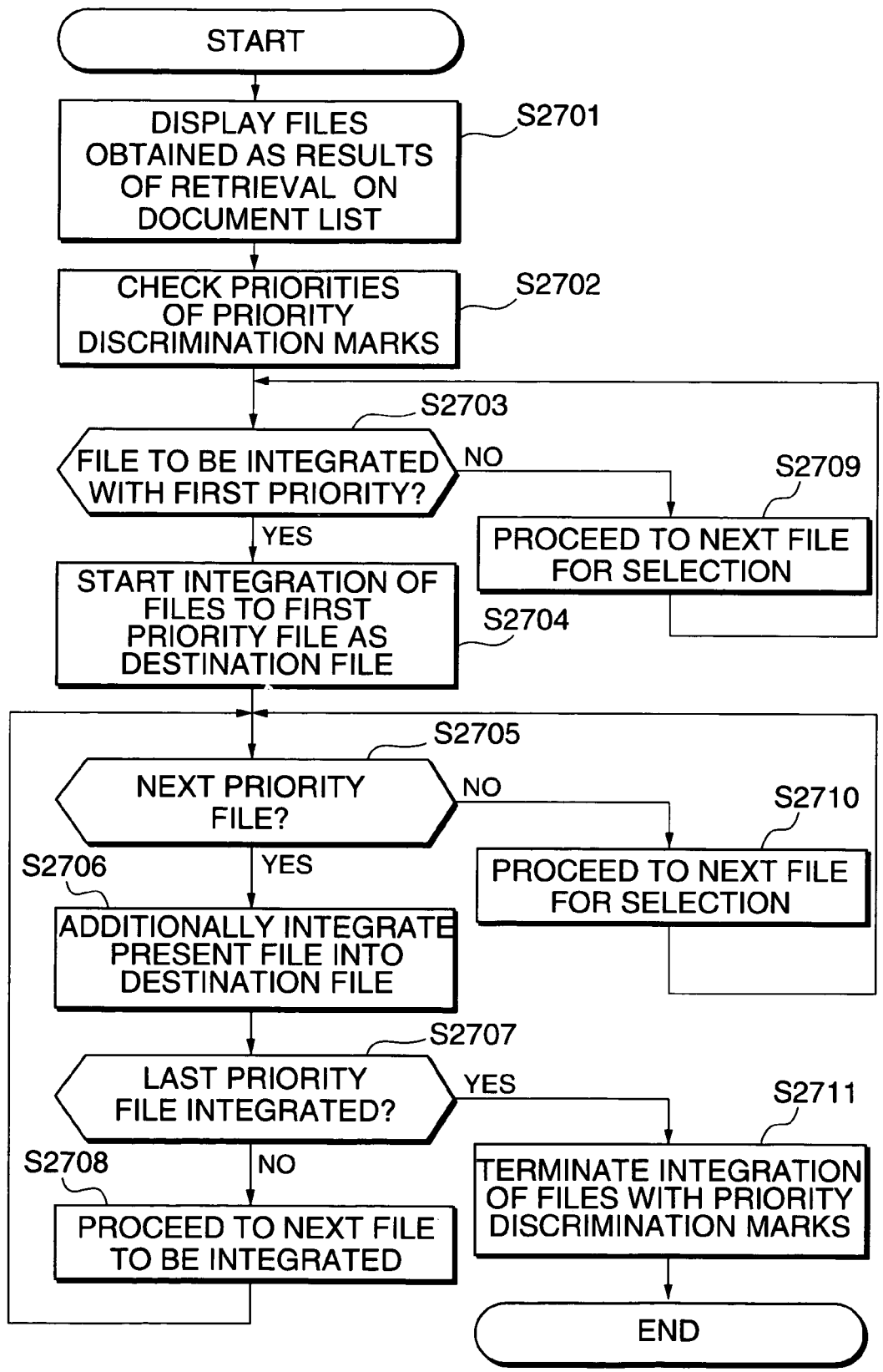
FIG. 27 is a flowchart showing a flow of an operation carried out by the document management system according to the first embodiment.

FIG. 27 is a flowchart showing a flow of an operation carried out when an instruction is issued for integrating files on a document list W provided with priority discrimination marks 72 into a file having a top priority mark ①. Examples of the document list W used in this case are shown in FIGS. 21 to 23.

Referring to FIG. 27, first, at a step S2701, files obtained as results of retrieval are displayed on the document list display means 410, and then, at the next step S2702, priorities of priority discrimination marks attached to the displayed files are checked. Then, at a step S2703 one of the files is selected and it is determined whether or not the selected file is a file to be integrated with the first priority. If it is determined that the selected file is to be integrated with the first priority, a file integration process for integrating files into the first priority file as an integration destination file is started at the next step S2704. Then, at a step S2705, a next one of the files is selected and it is determined whether or not the selected file is a file with the second priority. If it is determined that the selected file is a file with the second priority, the file is added to the integration destination file at the next step S2706. Then, at a step S2707, it is determined whether or not the last priority file has been integrated. If it is determined that the last priority file has not yet been integrated, a file desired to be integrated next is selected at the next step S2708, followed by the program returning to the above step S2705.

If it is determined at the above step S2703 that the selected file is not a file to be integrated with the first priority, a file selection operation is carried out on a next file at a step S2709, followed by the program returning to the above step S2703.

Further, if it is determined at the above step S2705 that the selected file is not a file with the second order of priority, the file selection operation is carried out on a next file at a step S2710, followed by the program returning to the above step S2705.

Further, if it is determined at the above step S2707 that the last priority file has been integrated, the integration operation for integrating files having priority discrimination marks attached thereto is completed at a step S2711, followed by terminating the present process.

As described above in detail, in the document management system which is capable of recording and retrieving files, a document list W which is an integration of a recording list and a retrieval list is used, and files requiring entry of index information are assigned with priority discrimination marks 72 with respective priorities displayed. Then, these plurality of files assigned with the priority discrimination marks 72 are collectively integrated into one file. As a result, the file integration operation can be carried out by confirming the order of integration of files on one document list W, which greatly enhances the operability of the system.

Although in the first embodiment described above, files displayed on a document list W are assigned with priority discrimination marks 72 on a file-by-file basis, this is not limitative, but priority discrimination marks 72 may be assigned to a plurality of documents which are collectively selected in advance, and then respective priorities of these documents may be set. Further, priority discrimination marks 72 may be assigned to files by specifying the file numbers.

Further, although in the integration of files in the first embodiment described above, selected files other than a first priority file are integrated into the first priority file, this is not limitative, but a file designated as this is not limitative, but for integration of files, a file to be an integration destination file may be specified, or a new file may be formed for integrating the files into the new file.

Further, although all the above examples are directed to processing of files, this is not limitative, but it goes without saying that the same processing operations can be carried out on pages in place of files.

As described in detail heretofore, according to the document management method and the document management system of the present embodiment, identifiers capable of having respective priorities independently of the order of display of results of a retrieval on a document list can be assigned to respective files, thereby permitting various processing operations to be collectively carried out on the files having the identifiers. As a result, it is possible to positively set the order of files to be subjected to a collective processing operation, before execution thereof. This makes it possible to improve the operability of the system when sequential processing operations are carried out on a plurality of files, particularly when the order of files to be subjected to a collective processing operation forms an important factor to the processing operation. This also makes it possible to reduce the occurrence of wrong operations.

Second Embodiment

Next, a second embodiment of the invention will be described with reference to FIGS. 28 to 30.

Since the basic configuration of a document management system according to the present embodiment is the same as that of the document management system according to the first embodiment described above with reference to FIGS. 3 and 4, description thereof is omitted.

An essential feature of the present embodiment lies in a manner of collectively copying files on a document list W, assigned with priority discrimination marks 72, onto another document list W.

When a plurality of files on a document list W are copied onto another document list W, the order of copying of the files is sometimes adversely affected by the order of display of the files on the document list W as a copying destination file. In such a case, according to the present embodiment, the copying order can be controlled by assigning priority discrimination marks indicative of priorities to files to be collectively copied in advance, so that it is possible to easily manage files on the document list W as the copying destination file.

Figure 28:
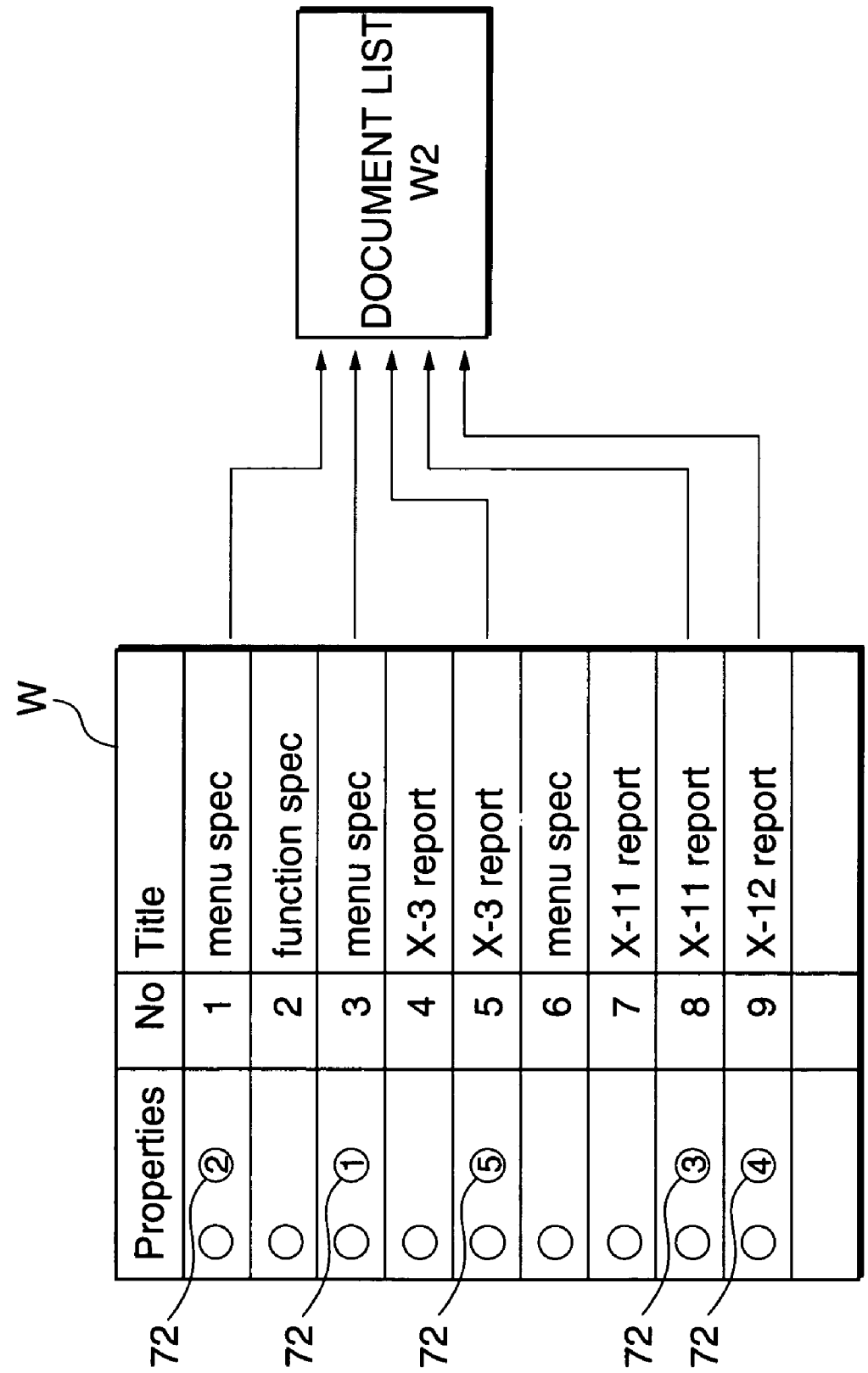
FIG. 28 is a diagram useful in explaining a document list used in a document management system according to a second embodiment of the invention.

FIG. 28 is a diagram useful in explaining the manner of collectively copying files with priority discrimination marks 72 on a document list W to another document list W2 according to the second embodiment. That is, files provided with Files Nos. 1, 3, 5, 8, and 9 on a document list W are collectively copied into another document list W2. On the document list W2, the files are arranged in the order in which they have been copied. In the conventional system using the files not assigned with the order of priority, the files are arranged in the order of ②, ①, ⑤, ③, and ④. The method according to the present embodiment, however, makes it possible to copy the files such that they are arranged according to their priorities, that is, in the order of ①, ②, ③, ④, and ⑤, as shown in FIG. 29.

Figure 30:
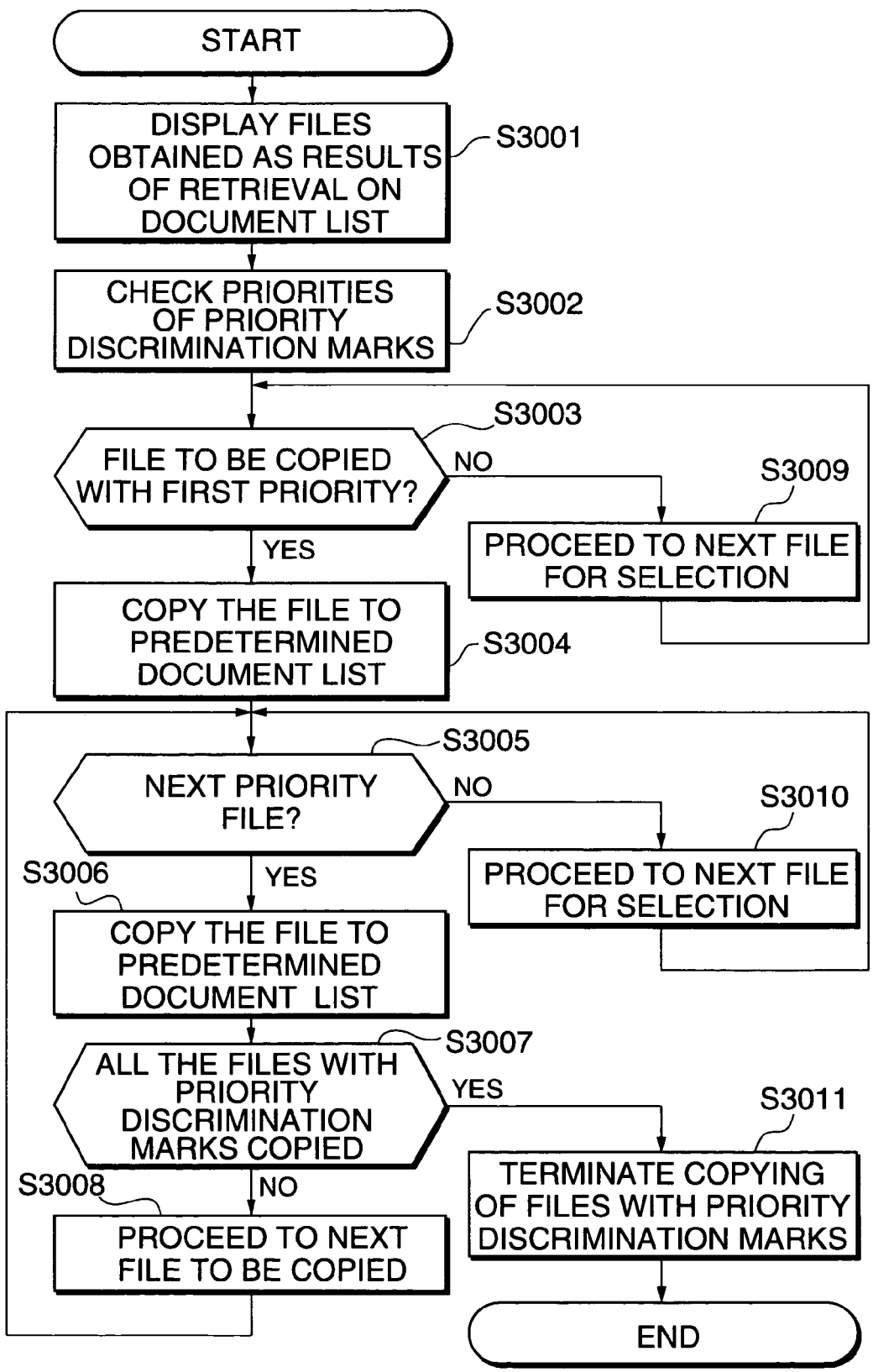
FIG. 30 is a flowchart showing a flow of an operation carried out by the document management system according to the second embodiment.

FIG. 30 is a flowchart showing a flow of an operation carried out by the document management system according to the present embodiment. This flowchart shows the method of copying files according to the priorities indicated by respective priority discrimination marks 72.

First, at a step S3001, retrieved files are displayed on the document list W, and at the next step S3002, priorities indicated by the priority discrimination marks of the retrieved files are checked. Then, at a step S3003, one of the files is selected and it is determined whether or not the selected file is a file to be copied with the first priority. If it is determined that the selected file is to be copied with the first priority, the file is copied onto a predetermined document list W at the next step S3004. Then, at a step S3005, a next one of the files is selected and it is determined whether or not the selected file is a file with the second priority. If it is determined that the selected file is a file with the second priority, the selected file is copied onto the predetermined document list W at the next step S3006. Next, at a step 3007, it is determined whether or not all the files with priority discrimination marks have been copied. If it is determined that all the files with priority discrimination marks have not yet been copied, a file having image information desired to be copied next is selected at the next step S3008, followed by the program returning to the above step S3005.

If it is determined at the above step S3003 that the selected file is not a file to be copied with the first priority, a file selection operation is carried out on a next file at a step S3009, followed by the program returning to the above step S3003.

Further, if it is determined at the above step S3005 that the selected file is not a file with the second priority, the file selection operation is carried out on a next file at a step S3010, followed by the program returning to the above step S3005.

Further, if it is determined at the above step S3007 that all the files with priority discrimination marks have been copied, the file copying operation for copying files with priority discrimination marks is completed at a step S3011, followed by terminating the present process.

Although in the present embodiment, files are copied by way of example, this is not limitative, but, of course, the present embodiment as a method of transferring a plurality of files to another document file, may be applied to a case where files are added, moved, exported, or the like.

Third Embodiment

Next, a third embodiment of the invention will be described with reference to FIGS. 31 to 35.

Figure 1:
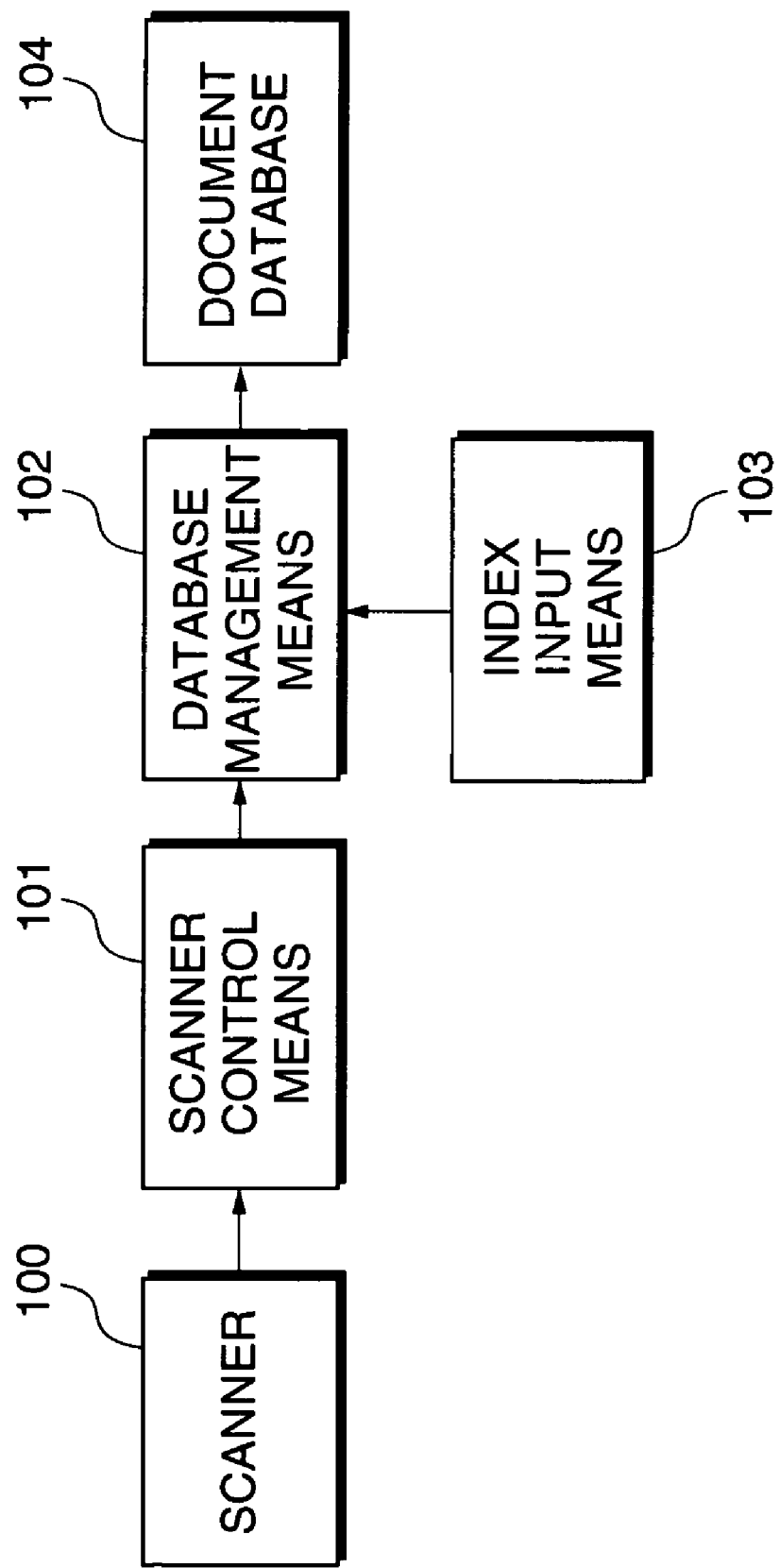
FIG. 1 is a block diagram showing the arrangement of software-based data processing components of the conventional document management system, for reading an original by using a scanner and storing the read image information in a document database.
Figure 2:
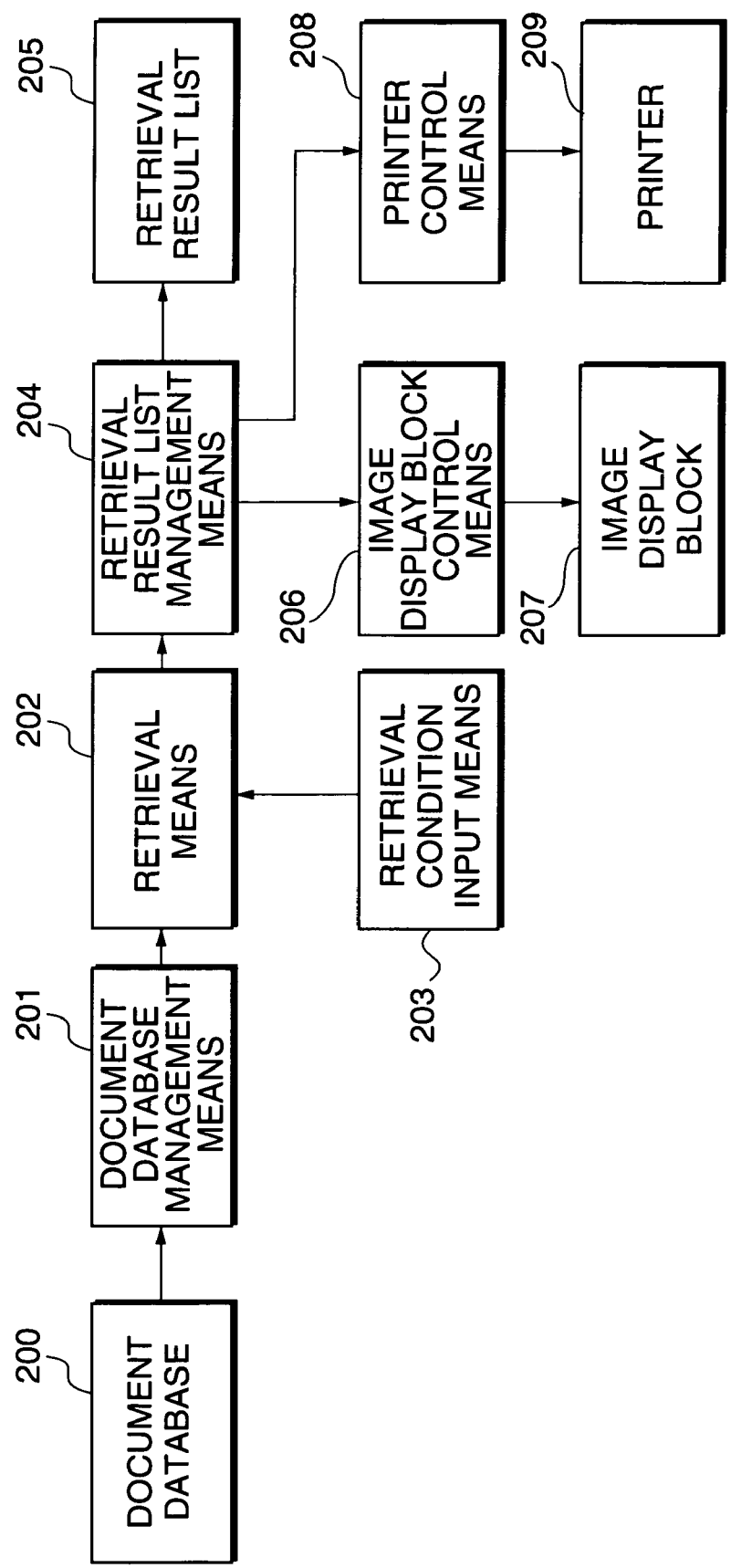
FIG. 2 is a block diagram showing the arrangement of software-based data processing components of the conventional document management system, for retrieving desired image information from the document database by using retrieving means.

Since the basic configuration of a document management system according to the present embodiment is the same as that of the document management system according to the first embodiment described above with reference to FIGS. 2 and 3, description thereof is omitted.

An essential feature of the present embodiment lies in a manner of temporarily rearranging (sorting) files with priority discrimination marks 72 on a document list W according to their priorities.

Although priority discrimination marks are marks provided for the files, sometimes a predetermined operation is desired to be temporarily carried out on these files with the priority discrimination marks according to their priorities. For instance, it is desired to attach a list of serial numbers taken out from a database to a predetermined area of some of files on a document list W for use as an index, and again display the files in their original states. When such an operation is carried out, since the priority discrimination marks have respective priorities, the files can be rearranged on the document list W according to their priorities. By thus temporarily rearranging the files on the document list W, it becomes possible to easily carry out a predetermined operation, such as the above-mentioned method of index post-addition operation.

FIG. 31 shows an example in which priority discrimination marks 72 are attached to some of files whose "Title" is "function spec". In a document list W shown in the figure, files are arranged or classified according to the order of the contents in boxes of the rank column. In this example, when only files having priority discrimination marks 72 are retrieved into a group, they are arranged in the order of ②, ④, ①, ⑤, and ③, as shown in FIG. 31. On the other hand, if the method according to the present embodiment is used, they can be rearranged according to their priorities, i.e. in the order of priorities as shown in FIG. 32. In the figure, box areas under a column "Chapter" for post-addition of index information are designated by symbol "□".

Figure 33:
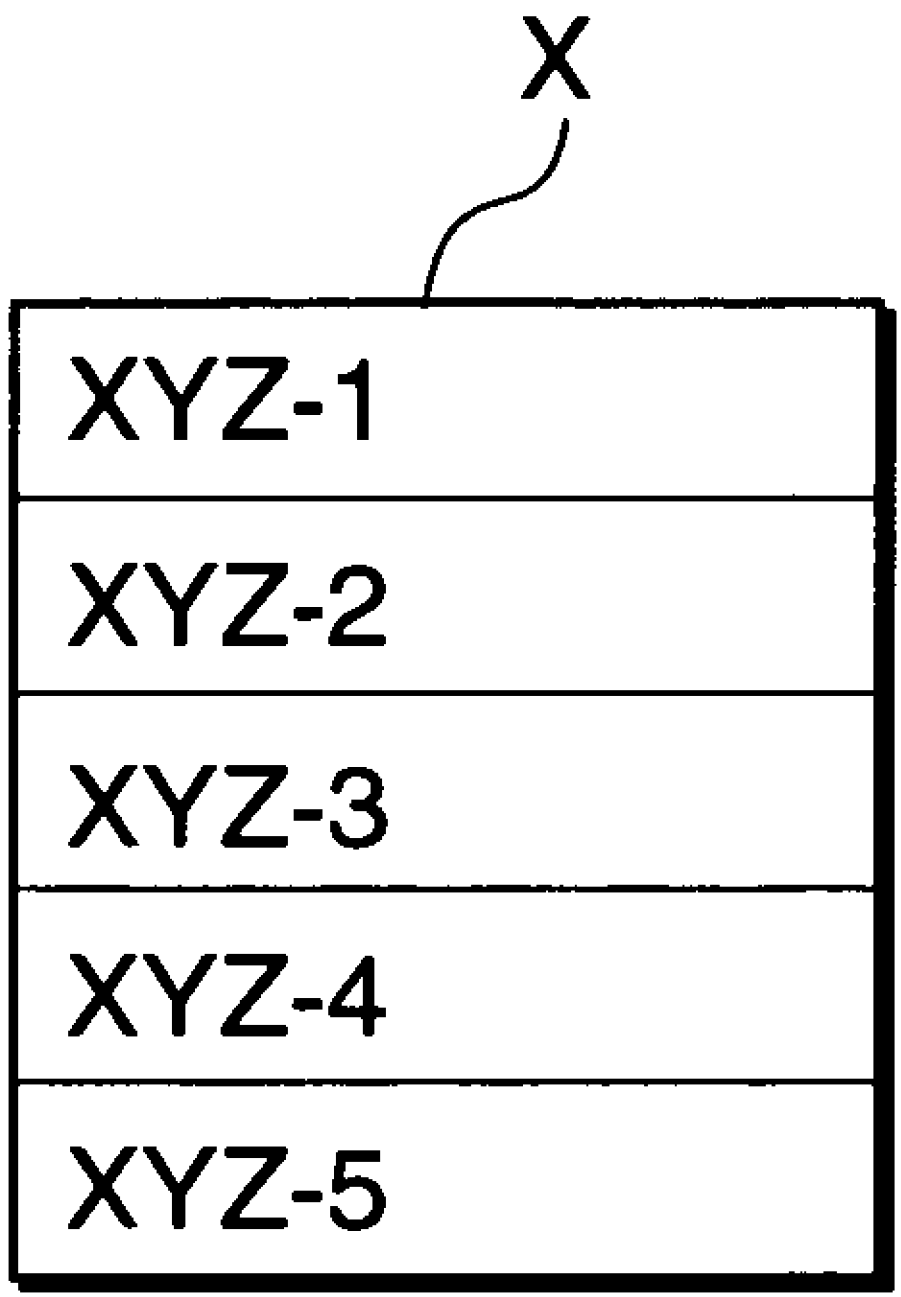
FIG. 33 is a diagram useful in explaining the document list used in the document management system according to the third embodiment.

As a result of the above rearranging operation, it becomes possible to attach index information taken out from a database, such as five index information items designated by a letter "X" in FIG. 33, to the files, as they are, or sequentially input index information to the files.

For example, data "XYZ-1", . . . , "XYZ-5" as shown in FIG. 34 can be pasted as they are to box areas under the column "Chapter" as index information. Since the file numbers are not changed, the order of files in the original document list W can be easily restored any time, as shown in FIG. 35, to cancel the temporary rearrangement. Thereafter, it is possible to continually carry out operations using priority discrimination marks 72.

Other Embodiments

The above embodiments are directed to a method of integrating files with priority discrimination marks on a document list W, a method of copying them, and a method of carrying out index post-addition operation. However, it goes without saying that the system according to the present invention may be applied to various processing operations of collectively processing a plurality of desired files or pages on a document list W according to priorities, such as export of files, pre-addition of index information, movement of files, movement of displayed pages, and movement of displayed files, movement of index-modified files, providing substantially the same effects.

In the document management system according to each of the above described embodiments, a control program stored in a storage medium is read out and executed by a computer, whereby the functions of the present embodiment described above are realized, so that the storage medium storing the program constitutes the present invention.

It should be noted that the invention is not limited to the above case in which the functions of the embodiment described above are realized by the computer which reads out and executes the control program stored in the storage medium, but it goes without saying that the invention is also applied to a case in which the functions of the above embodiment are realized by some or all of actual processing operations executed by an OS (operating system) running on the computer in response to instructions of the control program.

Further, as a storage medium storing a control program, there may be used, for instance, a floppy disk, a hard disk, an optical disk, a magneto-optical disk, a CD-ROM (Compact Disk Read Only Memory), a CD-R (Compact Disk Recordable), an electromagnetic tape, a nonvolatile memory card, a ROM, and the like.

What is claimed is:

1. A computer-implemented document management method of managing a plurality of files of documents by using a list having records concerning the files of documents, the method comprising the steps of:

displaying the list having the records concerning the files, the records being used for managing the plurality of files of documents;

assigning identifiers to some of records selected from the records displayed in the displayed list in response to a user's operation of selecting a processing order for the plurality of the displayed records, the identifiers having respective priorities which indicate a processing order in which the files corresponding to the selected plurality of records are to be processed, the priorities being independent of an order of display of the records in the list, wherein the assigned identifiers are displayed at the selected records in the displayed list when the identifiers are assigned in response to the user's operation, and wherein the displayed list includes the records to which the identifiers are assigned and the records to which the identifiers are not assigned; and executing a processing of the selected records to which the identifiers are assigned, in the processing order indicated by the respective priorities of the identifiers.

2. A computer-implemented document management method according to claim 1, further including the step of displaying the respective priorities of the identifiers being assigned to selected records.

3. A computer-implemented document management method according to claim 1, wherein the processing executed in said executing step comprises integrating the selected records to which the identifiers are assigned, in the processing order indicated by the respective priorities of the identifiers.

4. A computer-implemented document management method according to claim 1, wherein the processing executed in said executing step comprises copying the selected records to which the identifiers are assigned, in the processing order indicated by the respective priorities of the identifiers.

5. A computer-implemented document management method according to claim 1, wherein the processing executed in said executing step comprises moving the selected records to which the identifiers are assigned, in the processing order indicated by the respective priorities of the identifiers.

6. A computer-implemented document management method according to claim 1, wherein the processing executed in said executing step comprises sorting the selected records to which the identifiers are assigned, in the processing order indicated by the respective priorities of the identifiers.

7. A computer-implemented document management method according to claim 1, wherein the identifiers are marks.

8. A computer-implemented document management system capable of managing a plurality of files of documents with a list having records concerning the files of documents, the system comprising:

displaying means for displaying the list having the records concerning the files, wherein the records are for managing the plurality of files of documents;

identifier assigning means for assigning identifiers to with a plurality of records selected from the records displayed in the displayed list in response to a selection of a processing order for the plurality of the displayed records, the identifiers having respective priorities which indicate a processing order in which the files corresponding to the selected plurality of records are to be processed, the priorities being independent of an order of display of the records in the list, wherein the assigned identifiers are displayed at the selected records in the displayed list when the identifiers are assigned in response to the selection, and wherein the displayed list includes the records to which the identifiers are assigned and the records to which the identifiers are not assigned; and processing execution means for executing a processing of the records to which the identifiers are assigned, in the processing order indicated by the respective priorities of the identifiers.

9. A computer-implemented document management system according to claim 8, further including display means for displaying the respective priorities of the identifiers being assigned to the selected records.

10. A computer-implemented document management system according to claim 8, wherein the processing executed by said processing execution means comprises integrating the selected records to which the identifiers are assigned, in the processing order indicated by the respective priorities of the identifiers.

11. A computer-implemented document management system according to claim 8, wherein the processing executed by said processing executing means comprises copying the selected records to which the identifiers are assigned, in the processing order indicated by the respective priorities of the identifiers.

12. A computer-implemented document management system according to claim 8, wherein the processing executed by said processing execution means comprises moving the selected records to which the identifiers are assigned, in the processing order indicated by the respective priorities of the identifiers.

13. A computer-implemented document management system according to claim 8, wherein the processing executed by said processing execution means comprises sorting the selected records to which the identifiers are assigned, in the processing order indicated by the respective priorities of the identifiers.

14. A computer-implemented document management system according to claim 8, wherein the identifiers are marks.

15. A storage medium storing a program for managing a plurality of files of documents with a list having records concerning the files of documents, said program comprising:

a displaying module for displaying the list having the records concerning the files, wherein the records are for managing the plurality of files of documents;

an identifier assigning module for assigning identifiers to a plurality of records selected from the records displayed in the displayed list in response to a selection of a processing order for the plurality of the displayed records, the identifiers having respective priorities which indicate a processing order in which the files corresponding to the selected plurality of records are to be processed, the priorities being independent of an order of display of the records in the list, wherein the assigned identifiers are displayed at the selected records in the displayed list when the identifiers are assigned in response to the selection, and wherein the displayed list includes the records to which the identifiers are assigned and the records to which the identifiers are not assigned; and a processing execution module for executing a processing of the records to which the identifiers are assigned, in the processing order indicated by the respective priorities of the identifiers.

16. A storage medium according to claim 15, wherein said control program further includes a display module for displaying the respective priorities of the identifiers being assigned to the selected records.

17. A storage medium according to claim 15, wherein the processing executed by said processing execution module comprises integrating the selected records to which the identifiers are assigned, in the processing order indicated by the respective priorities of the identifiers.

18. A storage medium according to claim 15, wherein the processing executed by said processing executing module comprises copying the selected records to which the identifiers are assigned, in the processing order indicated by the respective priorities of the identifiers.

19. A storage medium according to claim 15, wherein the processing executed by said processing executing module comprises moving the selected records to which the identifiers are assigned, in the processing order indicated by the respective priorities of the identifiers.

20. A storage medium according to claim 15, wherein the processing executed in said processing executing module comprises sorting the selected records to which the identifiers are assigned, in the processing order indicated by the respective priorities of the identifiers.

21. A storage medium according to claim 15, wherein the identifiers are marks.

22. A storage medium according to claim 15, wherein the storage medium is a floppy disk.

23. A storage medium according to claim 15, wherein the storage medium is a hard disk.

24. A storage medium according to claim 15, wherein the storage medium is an optical disk.

25. A storage medium according to claim 15, wherein the storage medium is a magneto-optical disk.

26. A storage medium according to claim 15, wherein the storage medium is a CD-ROM (Compact Disk Read Only Memory).

27. A storage medium according to claim 15, wherein the storage medium is a CD-R (Compact Disk Recordable).

28. A storage medium according to claim 15, wherein the storage medium is a magnetic tape.

29. A storage medium according to claim 15, wherein the storage medium is a nonvolatile memory card.

30. A storage medium according to claim 15, wherein the storage medium is a ROM (Read Only Memory).

* * * * *